(12) United States Patent
Chong et al.

(10) Patent No.: US 10,916,037 B2
(45) Date of Patent: Feb. 9, 2021

(54) METHOD OF ENCODING AND DECODING CALIBRATION MARKER IDENTIFIERS

(71) Applicant: CANON KABUSHIKI KAISHA, Tokyo (JP)

(72) Inventors: Eric Wai Shing Chong, Carlingford (AU); Cameron Murray Edwards, Clovelly (AU)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 16/219,031

(22) Filed: Dec. 13, 2018

(65) Prior Publication Data
US 2020/0193642 A1 Jun. 18, 2020

(51) Int. Cl.
*G06T 7/80* (2017.01)
*G06T 9/00* (2006.01)
*H04N 19/60* (2014.01)
(52) U.S. Cl.
CPC ............. *G06T 7/85* (2017.01); *G06T 9/00* (2013.01); *H04N 19/60* (2014.11); *G06T 2207/30204* (2013.01)

(58) Field of Classification Search
CPC .................................. G06T 7/85; G06T 9/00
See application file for complete search history.

(56) References Cited

U.S. PATENT DOCUMENTS

| 4,606,004 A | * | 8/1986 | Crawford | G06T 11/005 |
| | | | | 378/901 |
| 4,874,936 A | | 10/1989 | Chandler et al. | |
| 5,748,491 A | * | 5/1998 | Allison | G06K 9/00503 |
| | | | | 702/190 |
| 7,204,419 B2 | | 4/2007 | Lizotte et al. | |
| 7,991,186 B2 | | 8/2011 | Rudaz et al. | |
| 2011/0038559 A1 | * | 2/2011 | Sugiura | G01V 1/48 |
| | | | | 382/275 |
| 2014/0267671 A1 | | 9/2014 | Kenny et al. | |
| 2016/0188972 A1 | * | 6/2016 | Lyons | G06K 9/522 |
| | | | | 382/207 |

* cited by examiner

*Primary Examiner* — Joshua L Schwartz
(74) *Attorney, Agent, or Firm* — Canon U.S.A., Inc. IP Division

(57) ABSTRACT

A method of generating an image, the method including receiving a two-dimensional pattern in the frequency domain, modifying one or more peripheral properties of the two-dimensional pattern and generating the image based on the modified two-dimensional pattern.

17 Claims, 14 Drawing Sheets

$$\Re\{c(x,y)\} + j\Im\{c(x,y)\} \Leftrightarrow C(u,v)$$

METHOD OF ENCODING AND DECODING CALIBRATION MARKER IDENTIFIERS

TECHNICAL FIELD

The present invention relates to the generation of a calibration marker pattern, and in particular to a method of encoding and decoding an identifier of the calibration marker pattern for performing a multi-camera calibration such as camera alignment.

BACKGROUND

In many imaging and display system applications, it can be advantageous to calibrate the imaging geometry using calibration patterns. Imaging and display systems which benefit from calibration include cameras.

Typically, a camera in an indoor environment (e.g., laboratory) can be calibrated using a chessboard calibration chart, where the chart is printed and mounted on a flat substrate and imaged at several positions and orientations by the camera. That is, the camera acquires multiple views of the calibration chart. In order to achieve an accurate calibration, the image of the chart captured in each view is expected to cover as much of the camera image as possible.

However, the chessboard calibration chart approach is not suitable for a multi-camera setup in a large arena such as a stadium, where the cameras are installed large distances apart. To calibrate multiple cameras, a calibration target must be viewable by two or more cameras. Furthermore, due to the large distances between the installed cameras, multiple calibration targets must be scattered throughout the arena in order to provide sufficient coverage in each camera image plane to determine corresponding image points between multiple camera views to solve a problem that is referred to as the correspondence problem accurately. Employing multiple chessboard calibration charts is not suitable because the chessboard charts are identical, as it is easy to confuse one chart with another chart nearby when there are multiple charts present under perspective distortion.

One type of calibration pattern is a coded target, which is a unique identifier for determining corresponding image points between multiple camera views. There is a variety of coded targets with various levels of success in solving the correspondence problem. Generally, the coding information is embedded in the form of linear, radial or angular bar codes with narrow or cornering geometric features. These coded targets tend to perform poorly in solving the correspondence problem under one or more of the following conditions:

Low target image resolution
Target imaged out-of-focus
Variable lighting conditions
Imaged under partial shadow
Imaged with a cluttered background
With partial occlusion
With image noise and distortion Most importantly, many of these coded targets are not designed for accurate sub-pixel position detection, which is an important requirement for a large number of other applications that employ calibration or fiducial markers such as:

Aligning a wafer in semi-conductor exposure equipment
Calibrating inkjet printer line feed
Calibrating a microscope for image stitching There is a need in the art to address one or more of the disadvantages of the coded targets or calibration markers described above.

SUMMARY

In accordance with an aspect of the present disclosure, there is provided a method of generating an image, the method comprising: receiving a two-dimensional pattern in the frequency domain; modifying one or more peripheral properties of the two-dimensional pattern; and generating the image based on the modified two-dimensional pattern.

In accordance with another aspect of the present disclosure, there is provided a method of calibrating cameras using the generated images of claim 1, the method comprising: receiving the generated images, wherein each of the generated images comprises a spatial pattern; normalising the received spatial patterns; transforming the normalised spatial patterns to the frequency domain, wherein each of the transformed spatial patterns comprises the two-dimensional pattern with modified one or more peripheral properties; detecting the modified one or more peripheral properties of each of the two-dimensional patterns; determining identifiers based on the properties of the detected modified one or more peripheral properties; measuring positions of the received spatial patterns; and calibrating the cameras based on the determined identifiers and the measured positions of the received spatial patterns.

In accordance with another aspect of the present disclosure, there is provided a method of decoding an identifier in an image, the method comprising: receiving the image, wherein the image comprises a spatial pattern; normalising the received spatial pattern; transforming the normalised spatial pattern to the frequency domain, wherein the transformed spatial pattern comprises a two-dimensional pattern with modified one or more peripheral properties; detecting the modified one or more peripheral properties of the two-dimensional pattern; and determining the identifier based on the properties of the detected modified one or more peripheral properties.

Aspects of the present disclosure also provide non-transitory computer readable medium comprising computer programs being executable by a processor, the computer programs comprise one of the methods described above.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
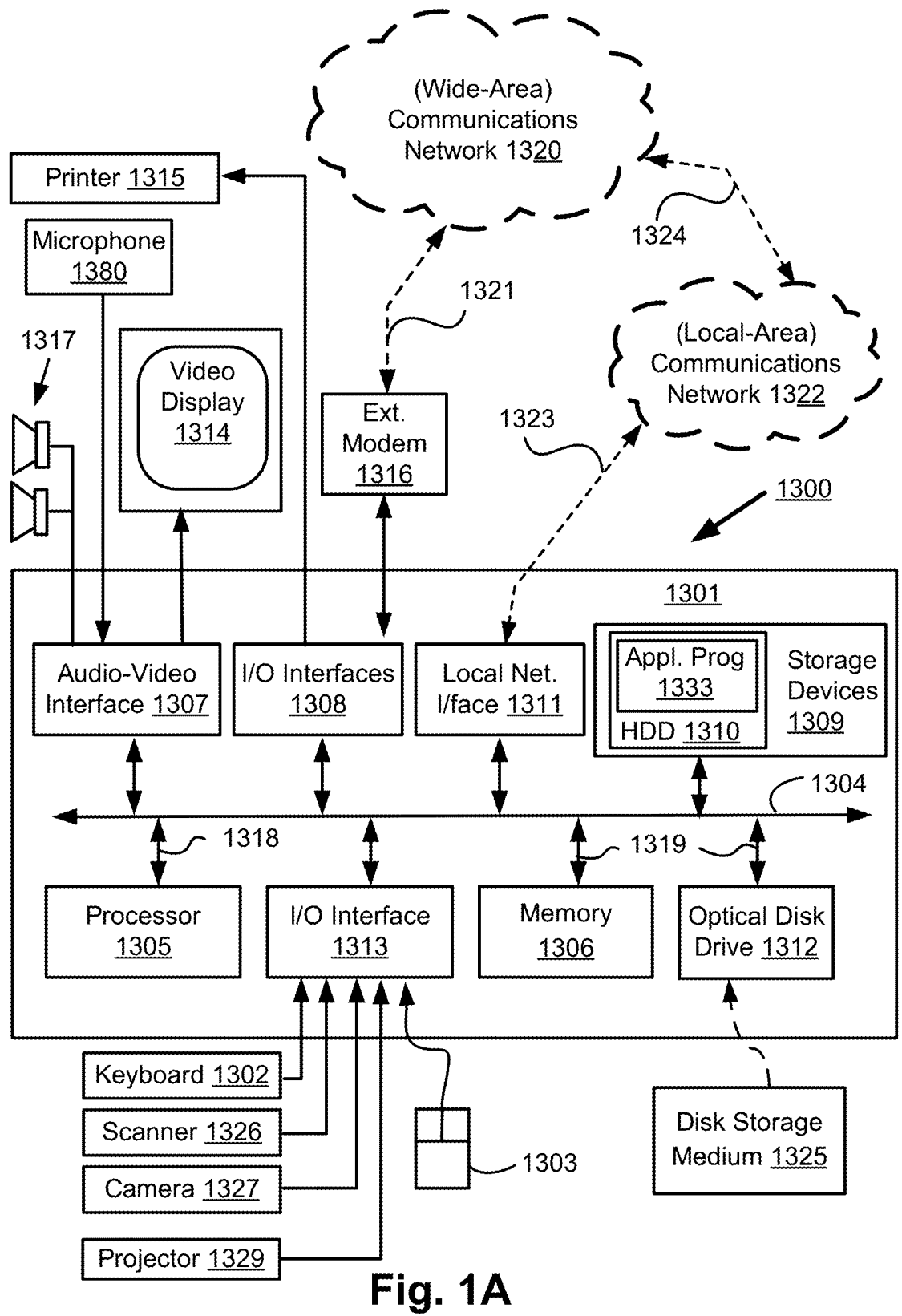
FIGS. 1A and 1B are schematic block diagrams of a computer and/or server on which the embodiments of the invention may be practised.

Where reference is made in any one or more of the accompanying drawings to steps and/or features, which have the same reference numerals, those steps and/or features have for the purposes of this description the same function(s) or operation(s), unless the contrary intention appears.

The present disclosure provides methods for generation of calibration patterns with unique identifiers that are suitable for high accuracy alignment. The methods seek to optimise the accuracy, speed and robustness of the decoding of marker identifiers and alignment accuracy of images of the calibration patterns. The method enables a single captured image to be used for estimating the alignment and decoding its identifier.

Context

The arrangements presently disclosed may be implemented on a variety of hardware platforms, including, for example, in a display device such as a computer monitor, in an imaging device such as a camera, on a general purpose computer (PC) or in a cloud computing implementation, such as on a server. When implemented on a general purpose computer, the arrangements disclosed cause the general purpose computer to operate in a non-standard manner.

Computer Description

Figure 1B:
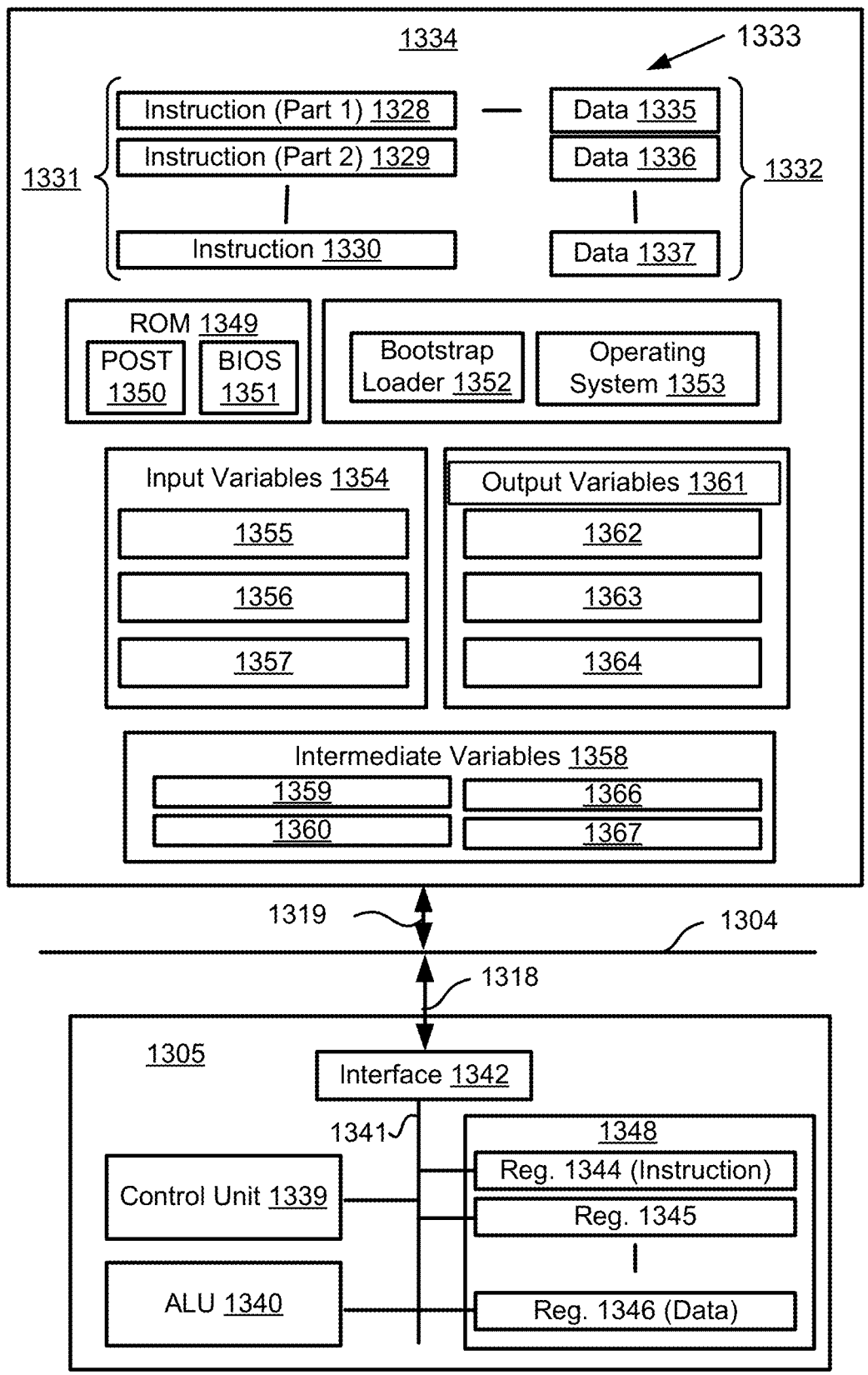

FIGS. 1A and 1B depict a general-purpose computer system 1300, upon which the various arrangements described can be practiced.

As seen in FIG. 1A, the computer system 1300 includes: a computer module 1301; input devices such as a keyboard 1302, a mouse pointer device 1303, a scanner 1326, a camera 1327, a projector 1329 and a microphone 1380; and output devices including a printer 1315, a display device 1314 and loudspeakers 1317. According to various embodiments, the arrangements described herein may be implemented on a combination of various equipment including, for example, a projection system that includes a projector (where the projector includes a camera incorporated therein) and a computer, a projection system that includes a projector, a separate camera in communication with the projector and a computer, a projection system that includes a projector (where the projector includes a camera incorporated therein) and a server in communication with the projector, a projection system that includes a projector, a separate camera in communication with the projector and a server in communication with the projector and/or camera. Where the projector has a camera incorporated therein, the built-in camera is arranged to capture images output from the projector and displayed on a projection surface. Also, where the camera is separate to the projector, the camera may be arranged to capture images output from the projector and displayed on a projection surface. The camera 1327 and/or projector 1329 may have a zoom lens in which the focal length of the lens may be varied. The camera may be a stills camera or a video camera.

An external Modulator-Demodulator (Modem) transceiver device 1316 may be used by the computer module 1301 for communicating to and from a communications network 1320 via a connection 1321. The communications network 1320 may be a wide-area network (WAN), such as the Internet, a cellular telecommunications network, or a private WAN. Where the connection 1321 is a telephone line, the modem 1316 may be a traditional "dial-up" modem. Alternatively, where the connection 1321 is a high capacity (e.g., cable) connection, the modem 1316 may be a broadband modem. A wireless modem may also be used for wireless connection to the communications network 1320.

The computer module 1301 typically includes at least one processor unit 1305, and a memory unit 1306. For example, the memory unit 1306 may have semiconductor random access memory (RAM) and semiconductor read only memory (ROM). The computer module 1301 also includes a number of input/output (I/O) interfaces including: an audio-video interface 1307 that couples to the video display 1314, loudspeakers 1317 and microphone 1380; an I/O interface 1313 that couples to the keyboard 1302, mouse 1303, scanner 1326, camera 1327, projector 1329 and optionally a joystick or other human interface device (not illustrated); and an interface 1308 for the external modem 1316 and printer 1315. In some implementations, the modem 1316 may be incorporated within the computer module 1301, for example within the interface 1308. The computer module 1301 also has a local network interface 1311, which permits coupling of the computer system 1300 via a connection 1323 to a local-area communications network 1322, known as a Local Area Network (LAN). As illustrated in FIG. 1A, the local communications network 1322 may also couple to the wide network 1320 via a connection 1324, which would typically include a so-called "firewall" device or device of similar functionality. The local network interface 1311 may comprise an Ethernet circuit card, a Bluetooth® wireless arrangement or an IEEE 802.11 wireless arrangement; however, numerous other types of interfaces may be practiced for the interface 1311.

The I/O interfaces 1308 and 1313 may afford either or both of serial and parallel connectivity, the former typically being implemented according to the Universal Serial Bus (USB) standards and having corresponding USB connectors (not illustrated). Storage devices 1309 are provided and typically include a hard disk drive (HDD) 1310. Other storage devices such as a floppy disk drive and a magnetic tape drive (not illustrated) may also be used. An optical disk drive 1312 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1300.

The components 1305 to 1313 of the computer module 1301 typically communicate via an interconnected bus 1304 and in a manner that results in a conventional mode of operation of the computer system 1300 known to those in the relevant art. For example, the processor 1305 is coupled to the system bus 1304 using a connection 1318. Likewise, the memory 1306 and optical disk drive 1312 are coupled to the system bus 1304 by connections 1319. Examples of computers on which the described arrangements can be practised include IBM-PC's and compatibles, Sun Sparcstations, Apple Mac™ or like computer systems.

The method of encoding or decoding an FNR marker pattern and various other methods described herein may be implemented using the computer system 1300 wherein the processes of FIGS. 4, 5, 6, 8, 11, and 12, to be described, may be implemented as one or more software application programs 1333 executable within the computer system 1300. In particular, the steps of the method of encoding or decoding an FNR marker pattern and various other methods described herein are effected by instructions 1331 (see FIG. 1B) in the software 1333 that are carried out within the computer system 1300. The software instructions 1331 may be formed as one or more code modules, each for performing one or more particular tasks. The software may also be divided into two separate parts, in which a first part and the corresponding code modules performs the calibration pattern encoding or decoding method and various other methods described herein and a second part and the corresponding code modules manage a user interface between the first part and the user.

The software may be stored in a computer readable medium, including the storage devices described below, for example. The software is loaded into the computer system 1300 from the computer readable medium, and then executed by the computer system 1300. A computer readable medium having such software or computer program recorded on the computer readable medium is a computer program product. The use of the computer program product in the computer system 1300 preferably effects an advantageous apparatus for decoding a calibration pattern and various other methods described herein.

The software 1333 is typically stored in the HDD 1310 or the memory 1306. The software is loaded into the computer system 1300 from a computer readable medium, and executed by the computer system 1300. Thus, for example, the software 1333 may be stored on an optically readable disk storage medium (e.g., CD-ROM) 1325 that is read by the optical disk drive 1312. A computer readable medium having such software or computer program recorded on it is a computer program product. The use of the computer program product in the computer system 1300 preferably effects an apparatus for decoding a calibration pattern and various other methods described herein.

In some instances, the application programs 1333 may be supplied to the user encoded on one or more CD-ROMs 1325 and read via the corresponding drive 1312, or alternatively may be read by the user from the networks 1320 or 1322. Still further, the software can also be loaded into the computer system 1300 from other computer readable media. Computer readable storage media refers to any non-transitory tangible storage medium that provides recorded instructions and/or data to the computer system 1300 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1301. Examples of transitory or non-tangible computer readable transmission media that may also participate in the provision of software, application programs, instructions and/or data to the computer module 1301 include radio or infra-red transmission channels as well as a network connection to another computer or networked device, and the Internet or Intranets including e-mail transmissions and information recorded on Websites and the like.

The second part of the application programs 1333 and the corresponding code modules mentioned above may be executed to implement one or more graphical user interfaces (GUIs) to be rendered or otherwise represented upon the display 1314. Through manipulation of typically the keyboard 1302 and the mouse 1303, a user of the computer system 1300 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1317 and user voice commands input via the microphone 1380.

FIG. 1B is a detailed schematic block diagram of the processor 1305 and a "memory" 1334. The memory 1334 represents a logical aggregation of all the memory modules (including the HDD 1309 and semiconductor memory 1306) that can be accessed by the computer module 1301 in FIG. 1A.

When the computer module 1301 is initially powered up, a power-on self-test (POST) program 1350 executes. The POST program 1350 is typically stored in a ROM 1349 of the semiconductor memory 1306 of FIG. 1A. A hardware device such as the ROM 1349 storing software is sometimes referred to as firmware. The POST program 1350 examines hardware within the computer module 1301 to ensure proper functioning and typically checks the processor 1305, the memory 1334 (1309, 1306), and a basic input-output systems software (BIOS) module 1351, also typically stored in the ROM 1349, for correct operation. Once the POST program 1350 has run successfully, the BIOS 1351 activates the hard disk drive 1310 of FIG. 1A. Activation of the hard disk drive 1310 causes a bootstrap loader program 1352 that is resident on the hard disk drive 1310 to execute via the processor 1305. This loads an operating system 1353 into the RAM memory 1306, upon which the operating system 1353 commences operation. The operating system 1353 is a system level application, executable by the processor 1305, to fulfil various high level functions, including processor management, memory management, device management, storage management, software application interface, and generic user interface.

The operating system 1353 manages the memory 1334 (1309, 1306) to ensure that each process or application running on the computer module 1301 has sufficient memory in which to execute without colliding with memory allocated to another process. Furthermore, the different types of memory available in the system 1300 of FIG. 1A must be used properly so that each process can run effectively. Accordingly, the aggregated memory 1334 is not intended to illustrate how particular segments of memory are allocated (unless otherwise stated), but rather to provide a general view of the memory accessible by the computer system 1300 and how such is used.

As shown in FIG. 1B, the processor 1305 includes a number of functional modules including a control unit 1339, an arithmetic logic unit (ALU) 1340, and a local or internal memory 1348, sometimes called a cache memory. The cache memory 1348 typically includes a number of storage registers 1344-1346 in a register section. One or more internal busses 1341 functionally interconnect these functional modules. The processor 1305 typically also has one or more interfaces 1342 for communicating with external devices via the system bus 1304, using a connection 1318. The memory 1334 is coupled to the bus 1304 using a connection 1319.

The application program 1333 includes a sequence of instructions 1331 that may include conditional branch and loop instructions. The program 1333 may also include data 1332 which is used in execution of the program 1333. The instructions 1331 and the data 1332 are stored in memory locations 1328, 1329, 1330 and 1335, 1336, 1337, respectively. Depending upon the relative size of the instructions 1331 and the memory locations 1328-1330, a particular instruction may be stored in a single memory location as depicted by the instruction shown in the memory location 1330. Alternately, an instruction may be segmented into a number of parts each of which is stored in a separate memory location, as depicted by the instruction segments shown in the memory locations 1328 and 1329.

In general, the processor 1305 is given a set of instructions which are executed therein. The processor 1305 waits for a subsequent input, to which the processor 1305 reacts to by executing another set of instructions. Each input may be provided from one or more of a number of sources, including data generated by one or more of the input devices 1302, 1303, data received from an external source across one of the networks 1320, 1302, data retrieved from one of the storage devices 1306, 1309 or data retrieved from a storage medium 1325 inserted into the corresponding reader 1312, all depicted in FIG. 1A. The execution of a set of the instructions may in some cases result in output of data. Execution may also involve storing data or variables to the memory 1334.

The disclosed FNR marker pattern encoding or decoding arrangements, and other arrangements described herein, use input variables 1354, which are stored in the memory 1334 in corresponding memory locations 1355, 1356, and 1357. These arrangements produce output variables 1361, which are stored in the memory 1334 in corresponding memory locations 1362, 1363, 1364. Intermediate variables 1358 may be stored in memory locations 1359, 1360, 1366 and 1367.

Referring to the processor 1305 of FIG. 1B, the registers 1344, 1345, 1346, the arithmetic logic unit (ALU) 1340, and the control unit 1339 work together to perform sequences of micro-operations needed to perform "fetch, decode, and execute" cycles for every instruction in the instruction set making up the program 1333. Each fetch, decode, and execute cycle comprises:
a fetch operation, which fetches or reads an instruction 1331 from a memory location 1328, 1329, 1330;
a decode operation in which the control unit 1339 determines which instruction has been fetched; and
an execute operation in which the control unit 1339 and/or the ALU 1340 execute the instruction.

Thereafter, a further fetch, decode, and execute cycle for the next instruction may be executed. Similarly, a store cycle may be performed by which the control unit 1339 stores or writes a value to a memory location 1332.

Each step or sub-process in the processes of FIGS. 4, 5, 6, 8, 11, and 12 is associated with one or more segments of the program 1333 and is performed by the register section 1344, 1345, 1347, the ALU 1340, and the control unit 1339 in the processor 1305 working together to perform the fetch, decode, and execute cycles for every instruction in the instruction set for the noted segments of the program 1333.

The method of encoding or decoding a calibration pattern and various other methods described herein may alternatively be implemented in dedicated hardware such as one or more integrated circuits performing the functions or sub functions of calibration pattern decoding and various other methods. Such dedicated hardware may include graphic processors, digital signal processors, or one or more microprocessors and associated memories.

Overview of the Invention

Calibration Pattern Generation

The disclosed arrangements provide a method of generating (e.g. develop, produce, provide, display or create) a Fourier noise ring (FNR) marker pattern with a unique identifier (ID). The unique identifier of the FNR marker pattern can be determined by a decoding algorithm. The unique identifier of the FNR marker pattern can be used as calibration markers for high accuracy and high speed image alignment in view of the correspondence problem (discussed above). The unique identifier of the FNR marker pattern can also be used for other applications that require accurate calibration or fiducial marker position detection. The image processing for generating and aligning the calibration pattern may be carried out, for example, in an embedded device such as a camera, or, in a computer or a server accessible via a communications network (1320 or 1322) as described with reference to FIGS. 1A and 1B.

Figure 2A:
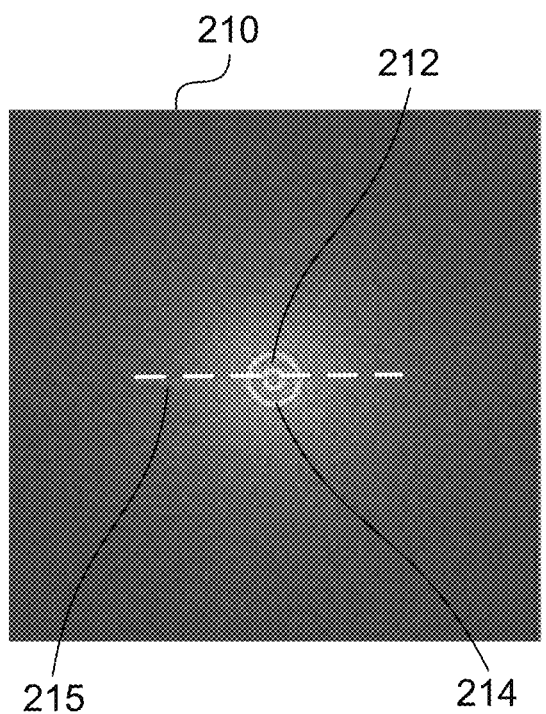
FIGS. 2A and 2B show an example of a Fourier noise ring (FNR) marker pattern in the frequency and spatial domains respectively.
Figure 2B:
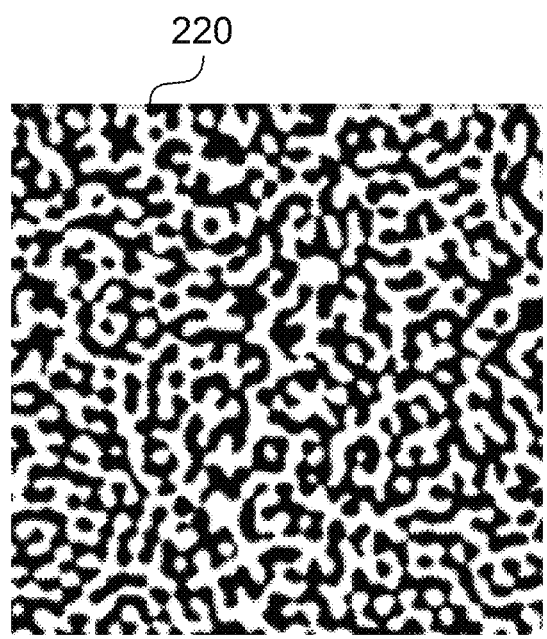

FIG. 2B shows an example of an FNR marker pattern 220 in the spatial domain. FIG. 2A shows the FNR marker pattern 220 in the frequency domain. As can be seen from FIGS. 2A and 2B, the FNR marker pattern 220 is a plurality of concentric rings 212 and 214 in the frequency domain (specifically in the magnitude spectrum 210). The FNR marker pattern 220 is designed in the frequency domain as a two-dimensional pattern (i.e., a plurality of concentric rings) with pseudo-random noise.

Figure 5:
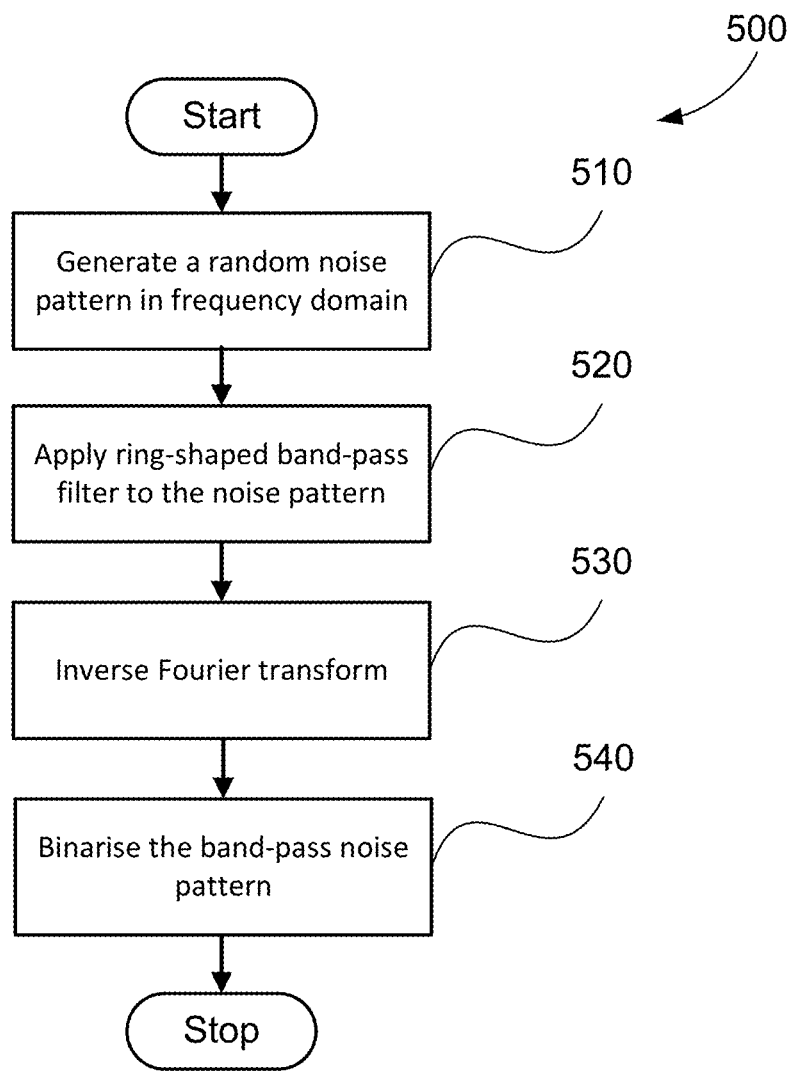
FIG. 5 is a schematic flow diagram illustrating a method of generating a single ring FNR marker pattern without an identifier.

FIG. 5 is a flow diagram of a method 500 of generating an FNR pattern with a single ring in the frequency domain. The method 500 can be implemented as one or more computer programs that are executable by the processor 1305.

The method 500 commences at a generating step 510. In the generating step 510, the FNR pattern 220 is created by starting with a two-dimensional complex-valued pseudo-random noise pattern with a uniform distribution and random seed s in the frequency domain $F(u, v)$ where u and v are spatial frequencies in horizontal and vertical directions at the generating step 510.

The magnitude of the frequency domain noise pattern is then set to unity, i.e., all frequency components have the same magnitude but each with a pseudo-random phase. The method 500 then proceeds from the generating step 510 to a filtering step 520.

In the filtering step 520, a circular mask with an inner and an outer radius $(r_{inner}, r_{outer})$ is applied to the noise pattern to form a noise ring $F_r(u, v)$ at the filtering step 520 such that all frequency components inside the radius $r_{inner}$ are set to zero, and all frequency components outside the radius $r_{outer}$ are also set to zero. Thus, $r_{outer} - r_{inner}$ defines the ring width.

The method 500 then proceeds from the filtering step 520 to a transforming step 530.

In the transforming step 530, an inverse Fourier transform is applied to the noise ring to convert the noise ring in the frequency domain to the FNR pattern $f_r(x, y)$ 220 in the spatial domain. In general, $f_r(x, y)$ is complex, so in practice the imaginary part tends to be discarded, and only the real part as the spatial pattern is used. Alternatively, the real part is discarded and only the imaginary part as the spatial pattern is used.

In one arrangement, the method 500 concludes at the conclusion of the transforming step 530. However, in one alternative arrangement (which is shown in FIG. 5), the method 500 proceeds from the transforming step 530 to a thresholding step 540.

In the optional thresholding step 540, the spatial pattern is binarised to create a black and white FNR marker pattern 220. The method 500 concludes at the conclusion of the optional thresholding step 540.

Figure 2C:
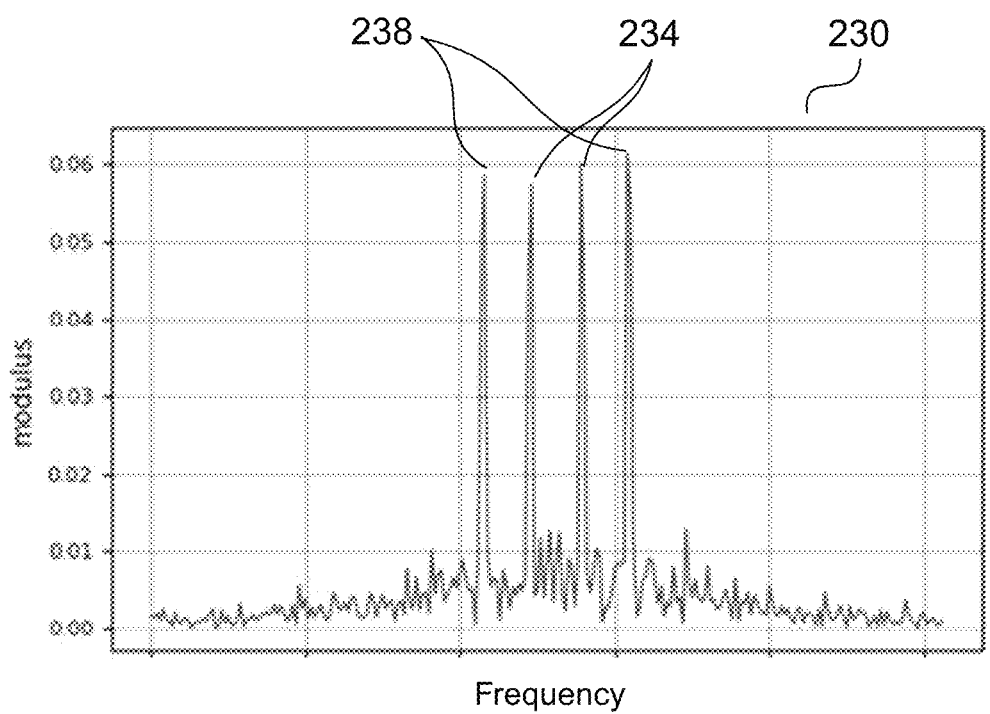
FIG. 2C shows a line profile of the FNR marker pattern shown in the frequency domain of FIG. 2A.

FIG. 2C shows a line profile 230 of the magnitude spectrum 210 of the FNR pattern 220, displaying the relative magnitudes of the frequency components along a dash line 215 (see FIG. 2A). The line profile 230 shows that the peaks 234 correspond to the inner ring 212 and the peaks 238 correspond to the outer ring 214.

The FNR pattern 220 is suitable for high accuracy alignment applications because it is a highly textured noise pattern with edges in all orientations. The FNR design is highly customisable as it allows the user to choose an appropriate number of rings, the width of each ring and the radius of each ring according to operating conditions such as lighting condition, physical marker target size, imaging resolution, etc. That is, based on the physical marker size and the camera resolution, the user may design a FNR pattern that can be fully resolved under those conditions when captured.

The FNR pattern 220 possesses a number of interesting characteristics that makes the pattern 220 an attractive choice as a calibration or fiducial marker. For example, the ring or circular structure (212 and 214) in the magnitude spectrum 210 of its Fourier representation is largely preserved under partial occlusion, so it is feasible to detect and identify the FNR pattern 220 based on the ring structure alone. The FNR pattern 220 is also robust to being imaged under partial shadow because the ring structure is largely unaffected by uneven illumination. The quality of the imaged FNR pattern 220 may be improved further by performing band-pass filtering according to its ring structure as shadow and uneven illumination tends to manifest itself as low frequency components or lines in the Fourier domain. The FNR pattern 220 is also robust to being imaged out-of-focus, as the resulting blurriness on the captured target is the direct result of removing high frequencies. Hence as long as the rings are located at lower frequencies than those removed (the user may design a FNR pattern with rings located at suitable frequencies according to the amount of expected image blur from camera being out-of-focus), then the ring structure is largely unaffected. The FNR pattern 220 is also easily identifiable in a cluttered scene due to its unique circular structure in the Fourier domain.

An overview of the process of encoding a unique identifier (ID) into the FNR pattern is now described with reference to FIG. 3. The ID is added to the two-dimensional pattern of the FNR pattern by modifying one or more peripheral properties of the two-dimensional pattern. Hereinafter, one or more discontinuities (e.g., notches) are included in the two-dimensional pattern (e.g., a ring)

Figure 3:
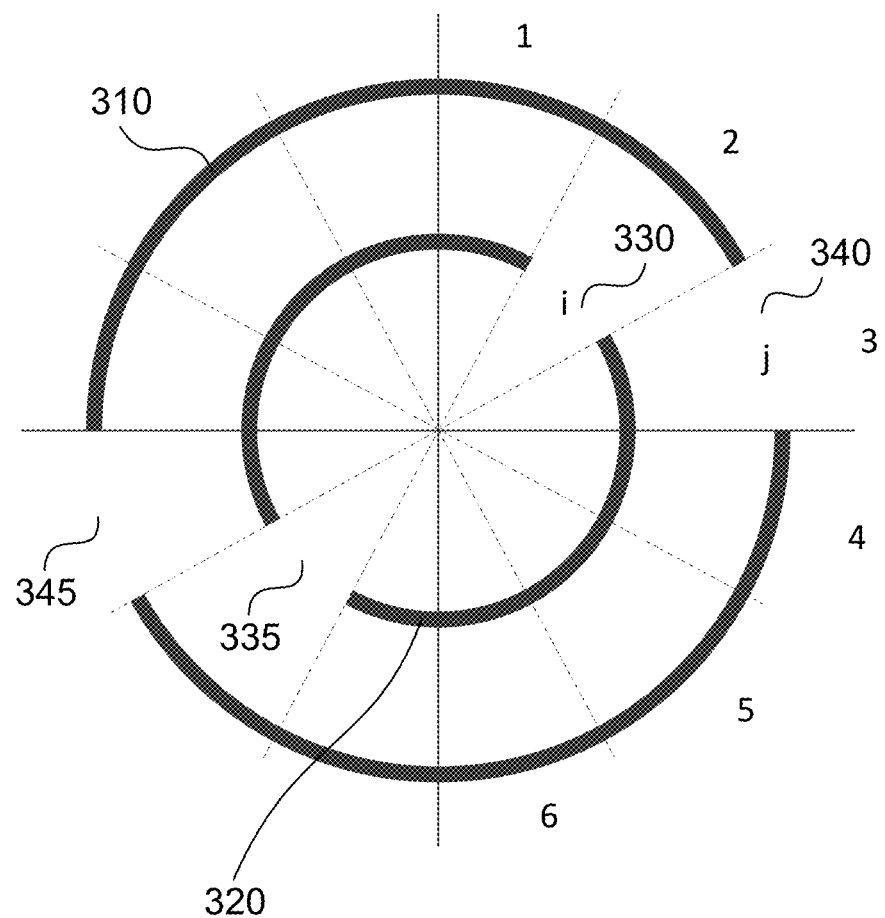
FIG. 3 is an illustration of an FNR marker pattern encoded with an identifier in the frequency domain.

FIG. 3 illustrates an exemplary FNR marker pattern with an ID in the frequency domain. The FNR marker pattern of FIG. 3 includes a circular structure with two concentric rings 310 and 320 with two pairs of symmetric notches (e.g., 330, 335, 340, 345). The ID of the FNR marker is encoded according to the positions of the notches as shown in FIG. 3. The encoding scheme of including (or adding) notches in a ring can be extended to allow for a systematic way to determine the corresponding ID for a given set of notch positions, and vice versa. This systematic approach can then be applied to generate a set of unique reference FNR markers.

There are many possible schemes for encoding IDs into an FNR marker pattern based on different notched ring arrangements. One particular FNR marker design involves two rings and a single symmetric pair of notches per ring as shown in FIG. 3. The FNR marker of FIG. 3 includes two concentric rings 310 and 320, each ring 310 and 320 has a single symmetric pair of notches (e.g., 330 and 335 correspond to a symmetric notch i, and 340 and 345 correspond to a symmetric notch j), and each notch, spanning an arc of 30°, can take one of the six angular positions denoted by the numbers $\{1, \ldots, 6\}$ in FIG. 3. The magnitude spectrum of the Fourier transform of an FNR marker pattern in the spatial domain is symmetric about the centre or the DC position in the frequency domain. With six possible inner ring notch positions and six possible outer ring notch positions, a total of 36 unique IDs are available.

Accordingly, an ID of an FNR marker can be derived with the following equation:

$$\text{FNR Marker ID} = 6(i-1) + j \quad (1)$$

where $i = \{1, \ldots, 6\}$ is the inner ring notch position, and $j = \{1, \ldots, 6\}$ is the outer ring notch position.

To decode the ID of a captured FNR marker, the two notch positions i and j are detected, and the above equation is applied with the detected i and j notch positions.

Conversely, to encode an ID, notch positions i and j can be derived using the following equations:

$$i = \left\lfloor \frac{\text{Marker } ID - 1}{6} \right\rfloor + 1 \quad (2)$$

$$j = \text{Marker } ID - 6(i-1) \quad (3)$$

Herein, the terms "ID" and "marker ID" are the same and may be used interchangeably.

In one alternative arrangement, three or more rings may be used to increase the total number of identifiers, provided the imaging resolution is high enough and the imaging condition is suitable to resolve the highest frequency features.

In one alternative arrangement, each ring may be partitioned into smaller segments (e.g., a segment with an arc of 10°), so that the total number of identifiers is increased. The size of the segments depends on the imaging condition and the resolution suitable to resolve smaller notches in the frequency domain.

Equations (1-3) may need to be modified based on the number of rings and notch size.

If, however, imaging resolution and conditions do not allow encoding with more rings or more notch positions, the total number of unique IDs may be expanded through using a random phase (i.e., a different random seed is used for the construction of each additional unique FNR pattern). As described above in relation to the method 500 in FIG. 5, the FNR pattern is derived from a pseudo-random noise pattern with a random seed s, so changing the random seed from one value to another results in a different spatial FNR pattern.

Starting with a set of 36 notched ring arrangements as described with reference to FIG. 3, the set of IDs can be expanded by using different random seeds. For example, if five random seeds are used for 36 notched ring arrangements, a total of 180 different FNR markers based on the random seeds and notch arrangements is possible. It should be noted that the five random seeds for one notched ring arrangement do not need to be the same as the five random seeds for another notched ring arrangement. To maximise the randomness between the FNR spatial patterns, each FNR spatial pattern should have a unique random seed. Therefore, for a set of 180 different FNR markers, there are 180 different random seed values.

However, when using random phase, it is no longer possible to perform decoding solely based on the detected notch positions. Instead, in the example of using five random seeds per notched ring arrangement, the detected notch positions i and j represent a family of five candidate FNR markers. The correct marker ID of an FNR marker can only be determined by comparing each of the five candidate FNR markers against the captured FNR marker via cross-correlation. In practice, the ID detection process is very fast as the FNR markers used for correlation are usually quite small (e.g., 200×200 pixels), and Fourier transform of small patches is very fast and efficient.

Accordingly, an ID of an FNR marker can be derived with the following equation:

$$\text{Marker ID} = 6(i-1) + j + 36(k-1) \quad (4)$$

where i={1, ..., 6} is the inner ring notch position, j={1, ..., 6} is the outer ring notch position, and k={1, ..., 5} is the sub-pattern index.

To decode the ID of a captured FNR marker, the following steps are performed:
1. detect the two notch positions i and j, and apply equation (4) with k={1, ..., 5} to obtain a set of five candidate FNR markers; and
2. perform correlation between the captured FNR and each of the candidate FNR markers to determine the best match candidate FNR marker.

Conversely, to encode a marker ID, noise seed s, notch positions i and j, and sub-pattern index k can be derived using the following equations:

$$k = \left\lfloor \frac{\text{Marker } ID - 1}{36} \right\rfloor + 1 \quad (5)$$

$$\text{Basic } ID = \text{Marker } ID - 36(k-1) \quad (6)$$

$$i = \left\lfloor \frac{\text{Basic } ID - 1}{6} \right\rfloor + 1 \quad (7)$$

$$j = \text{Basic } ID - 6(i-1) \quad (8)$$

$$\text{pseudo-random noise seed } s = \text{Marker } ID \quad (9)$$

The Basic ID is only used in equations (6) to (8) to determine the notch positions i and j from the marker ID. Equations (5) to (9) are used by setting the marker ID with a value from 1 to 180, which correspond to the 180 possible IDs based on 5 random seeds and 6 notch positions in each ring.

Different equations are required for different number of random seeds and notch positions.

An overview of the process of encoding a unique ID into an FNR pattern, where the ID is encoded using a single ring and a single pair of notches in the frequency domain is described with reference to FIG. 10A.

Figure 10A:
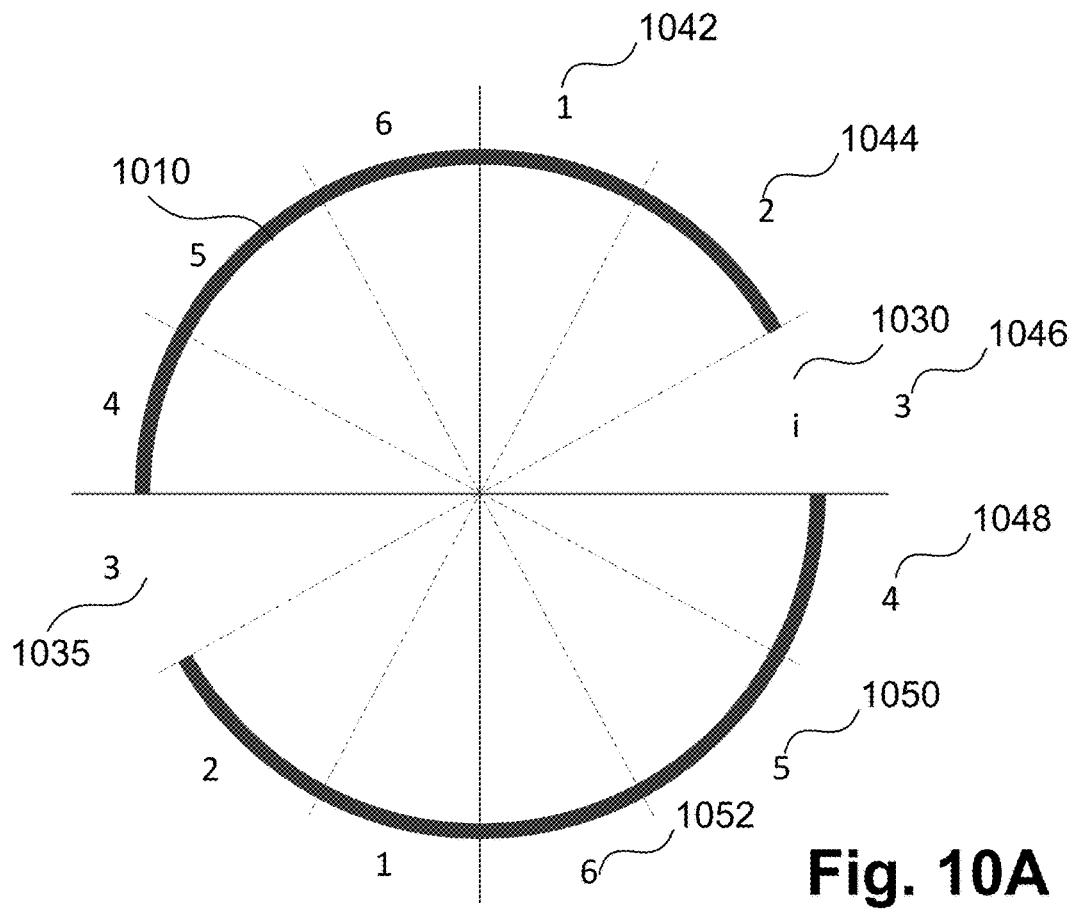
FIGS. 10A and 10B are illustrations of single ring FNR marker patterns in the frequency domain encoded with a single symmetric and non-symmetric notch, respectively.

FIG. 10A illustrates an exemplary FNR marker pattern with one ring 1010 in the frequency domain. The ID of an FNR marker is encoded according to the positions of the notches as shown in FIG. 10A. The encoding scheme of including notches in a ring can be extended to allow for a systematic way to determine the corresponding ID for a given set of notch positions, and vice versa. This systematic approach can then be applied to generate a set of unique reference FNR markers.

There are many possible schemes for encoding IDs into an FNR marker pattern based on different notched ring arrangements. One particular FNR marker design involves one ring and a single symmetric pair of notches is shown in FIG. 10A. The FNR marker of FIG. 10A includes one Fourier noise ring 1010, which has a single symmetric pair of notches (e.g., notches 1030 and 1035 corresponding to a symmetric notch i (angular position 3 (1046))). Each notch 1030, 1035 spans an arc of 30° and can take one of the six angular positions 1 (1042), 2 (1044), 3 (1046), 4 (1048), 5 (1050), and 6 (1052). The magnitude spectrum of the Fourier transform of a real-valued (i.e., non-complex) FNR marker pattern is symmetric about the centre or the DC position in the frequency domain. With six possible notch positions, a total of 6 unique marker patterns are available.

Figure 10B:
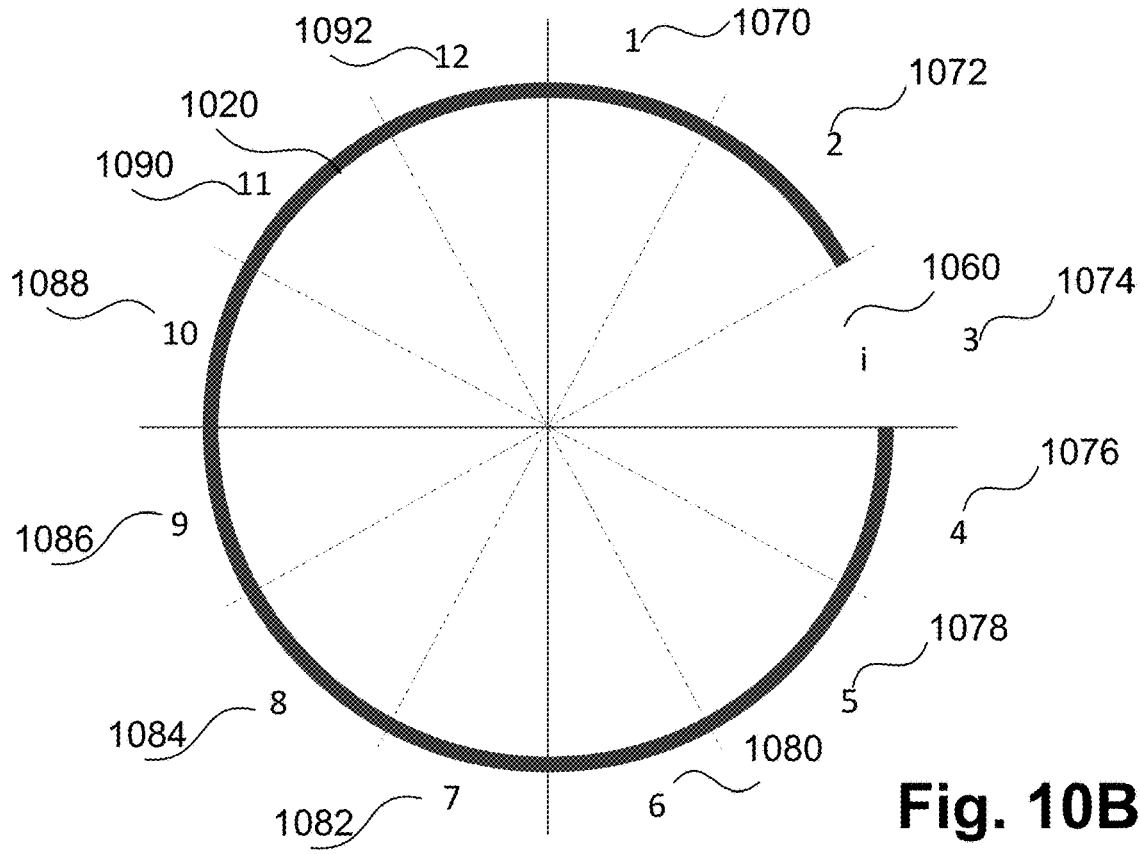

FIG. 10B illustrates one alternative arrangement of an FNR marker pattern having one ring 1020 in the frequency domain. The ring 1020 has one non-symmetric notch i in any one of the twelve angular positions 1 (1070), 2 (1072), 3 (1074), 4 (1076), 5 (1078), 6 (1080), 7 (1082), 8 (1084), 9 (1086), 10 (1088), 11 (1090) and 12 (1092). For example, a notch 1060 is placed in the ring 1020 without a complementary notch at position 1086. However, only a complex-valued image can have a non-symmetric Fourier transform (magnitude spectrum), so the FNR marker pattern must be represented in such a way that a complex image can be reconstructed. In this case instead of just extracting the real component, both the real and imaginary components are used.

Figure 13A:
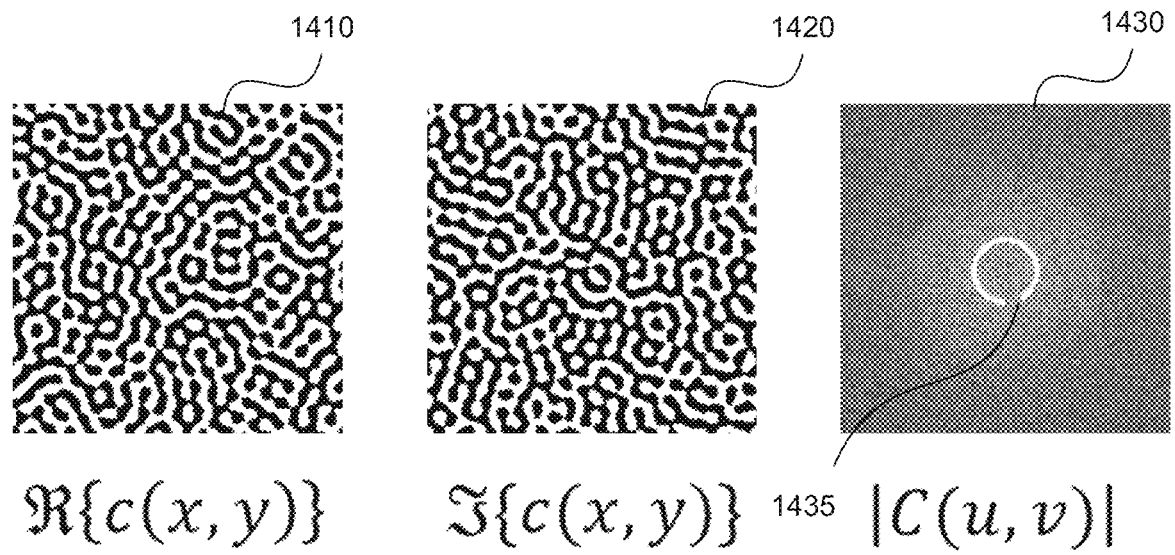
FIGS. 13A and 13B are illustrations of a complex-valued FNR marker pattern in spatial and frequency domains, and the complex-valued FNR marker pattern represented as an RGB image, respectively.

FIG. 13A shows how a single non-symmetric notch in the frequency domain of an FNR marker pattern can be generated using a complex image c(x, y) with a real component $\Re\{c(x, y)\}$ 1410 and an imaginary component $\Im\{c(x, y)\}$ 1420. The resultant magnitude spectrum |C(u, v)| 1430 of the Fourier transform of the complex image c(x, y) has a single non-symmetric notch 1435.

Figure 13B:
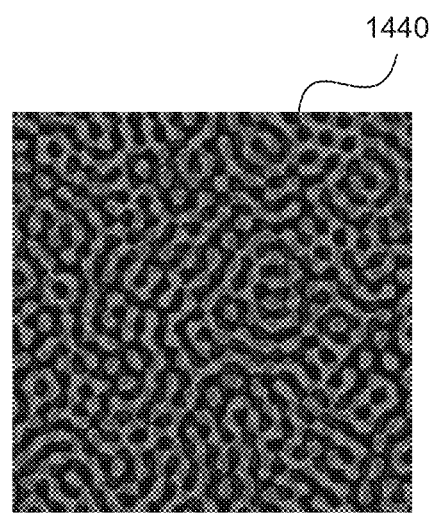

Although real-world images are real-valued, a complex image can be represented by two real-valued images for the real and imaginary components. One approach to represent the complex image physically as a single 2D marker pattern (for camera calibration) with the two spatial patterns (e.g., 1410 and 1420) is to store them in the different colour channels of an RGB image. For example, the real pattern 1410 is stored in the red channel, and the imaginary pattern 1420 is stored in the blue channel. In the case of binary real and imaginary patterns, the resultant RGB image 1440 in FIG. 13B will have four different colours as shown in the following table:

TABLE 1

| | Colour representation of a complex image | |
|---|---|---|
| Pixel colour | Real pattern pixel value | Imaginary pattern pixel value |
| Red | 255 | 0 |
| Blue | 0 | 255 |
| Magenta | 255 | 255 |
| Black | 0 | 0 |

Alternatively, the real and imaginary patterns can be represented using other distinctive colours such as magenta and cyan, respectively.

To reconstruct the complex image c(x, y), the colour 2D pattern 1440 is decomposed into two spatial patterns (real and imaginary parts of the complex image) based on the respective colours of the real and imaginary patterns according to a colour representation table such as the one shown in Table 1. Once the real and imaginary patterns, 1410 and 1420, are extracted from the colour pattern 1440, the complex image can be reconstructed: $c(x, y) = \Re\{c(x, y)\} + j\Im\{c(x, y)\}$. Decoding of the FNR marker ID can then proceed by detecting the notch position 1435 of the magnitude spectrum 1430 of the Fourier transform C(u, v) in the frequency domain.

Accordingly, an ID of an FNR marker as shown in FIG. 10A can be derived with the following equation:

$$\text{FNR Marker ID} = i \qquad (100)$$

where i={1, . . . , 6} is the ring notch position for the symmetric case in FIG. 10A, and i={1, . . . , 12} is the ring notch position for the non-symmetric case in FIG. 10B.

To decode the ID of a captured FNR marker with a single ring and a single pair of symmetric notches 1030 and 1035 (or a single notch 1060), the notch position i is detected, and the above equation (10) is applied with the detected i position.

Conversely, to encode an ID, the notch position i can be derived using the following equation:

$$i = \text{Marker ID} \qquad (11)$$

In one alternative arrangement, more rings may be used to increase the total number of identifiers, provided the imaging resolution is high enough and the imaging condition is suitable to resolve the highest frequency features.

In one alternative arrangement, each ring may be partitioned into smaller segments (e.g., a segment with an arc of 10°), so that the total number of identifiers is increased. The size of the segments depends on the imaging condition and resolution suitable to resolve smaller notches in the frequency domain.

Equations (10-11) may need to be modified based on the number of rings and notch size.

If, however, imaging resolution and conditions do not allow encoding with more rings or more notch positions, the total number of unique IDs may be expanded through using a random phase (i.e., a different random seed is used for the construction of each additional unique FNR pattern). As described above in relation to the method 500 in FIG. 5, the FNR pattern is derived from a pseudo-random noise pattern with a random seed s, so changing the random seed from one value to another results in a different spatial FNR pattern.

Starting with a set of 6 and 12 unique notched ring arrangements for symmetric and non-symmetric notches as described with reference to FIGS. 10A and 10B, respectively, the set of IDs can be expanded by using different random seeds. For example, if five random seeds are used for each of the 6 and 12 notched ring arrangements, a total of 30 and 60 different FNR markers for the symmetric or non-symmetric notch arrangements, respectively, is possible. It should be noted that the five random seeds are different for each notched ring arrangement, therefore in this example there are in total 30 and 60 different random seeds for the symmetric and non-symmetric notch arrangements, respectively.

However, when using random phase, it is no longer possible to perform decoding solely based on detected notch positions. Instead, in the example of using five random seeds per notch arrangement, the detected notch position i represents a family of five candidate FNR markers. The correct marker ID of an FNR marker can only be determined by comparing each of the five candidate FNR markers against the captured FNR marker via cross-correlation. In practice, the ID detection process is very fast as the FNR markers used for correlation are usually quite small (e.g., 200×200 pixels), and Fourier transform of small patches is very fast and efficient.

Accordingly, the ID of an FNR marker can be derived with the following equation:

$$\text{Marker ID} = i + 6(k-1) \qquad (12)$$

where i={1, . . . , 6} is the ring notch position for symmetric notches or i={1, . . . , 12} for non-symmetric notches, and k={1, . . . , 5} is the sub-pattern index.

To decode the ID of a captured FNR marker with a single ring and a single symmetric pair of notches (or a single notch), the following steps are performed:

1. detect the notch position i, and apply equation (12) with k={1, . . . , 5} to obtain a set of five candidate IDs. For symmetric notches, the notch position i is the sector with the weakest magnitude summed over its arc segment on either the right or left semi-circle as shown in FIG. 10A. For non-symmetric notches, the notch position i is the sector with the weakest magnitude summed over its arc segment over the entire circle as shown in FIG. 10B; and
2. perform correlation between the captured FNR marker and each of the candidate FNR markers to determine the best match candidate.

Conversely, to encode a marker ID, noise seed s, notch position i, and sub-pattern index k can be derived using the following equations:

$$k = \left\lfloor \frac{\text{Marker } ID - 1}{6} \right\rfloor + 1 \qquad (13)$$

$$i = \text{Marker } ID - 6(k - 1) \qquad (14)$$

$$\text{pseudo-random noise seed } s = \text{Marker } ID \qquad (15)$$

Figure 9:
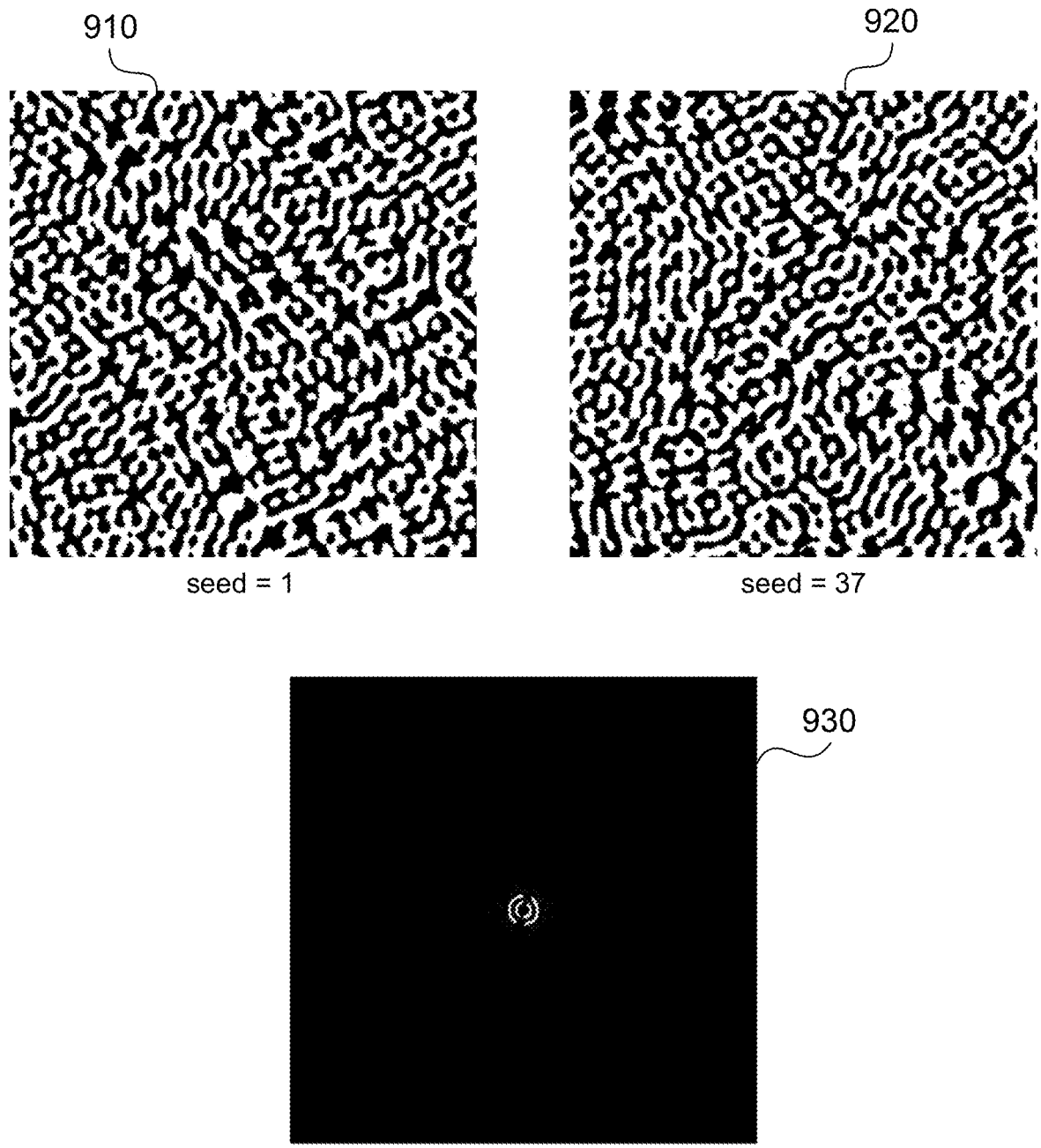
FIG. 9 shows illustrations of two different FNR marker patterns in the spatial domain having the same magnitude spectrum in the frequency domain.

An example of generating different FNR patterns with a random phase is shown in FIG. 9. FIG. 9 shows two different FNR patterns 910 and 920 in the spatial domain, where both patterns 910 and 920 have the same notch arrangement in the magnitude spectrum 930 of the Fourier transform in the frequency domain.

It should be noted that accurate unwarping and rectification of captured FNR markers is required for this ID decoding technique to work well because correlation assumes the underlying transformation is purely translational, therefore the level of residual distortion after rectification is likely to correspond inversely to the level of robustness of the approach.

The symmetric nature of the Fourier transform of a real-valued signal limits the number of different notch arrangements that can be implemented as shown in FIG. 10A. It is, however, possible to create non-symmetric notch arrangements using a complex FNR marker pattern as described above with reference to FIG. 10B.

In practice, an FNR pattern of a complex function (see the discussion above in relation to step 530) can be represented using two different colour patterns superimposed together. Therefore, the imaginary part of the complex function does not need to be discarded. For example, the real component of the complex function may be stored in the red channel of a RGB image, while the imaginary component may be stored in the blue channel. As a result, pixels that belong to non-zero real and imaginary components are displayed in magenta (=red+blue). Pixels that belong to zero real and imaginary parts are black. It should be noted that different colour combinations may be used to represent the complex pattern. Cyan and magenta are another example for the real and imaginary components. In particular, different colour combinations may be chosen depending on the operating environment to speed up marker detection.

Figure 4:
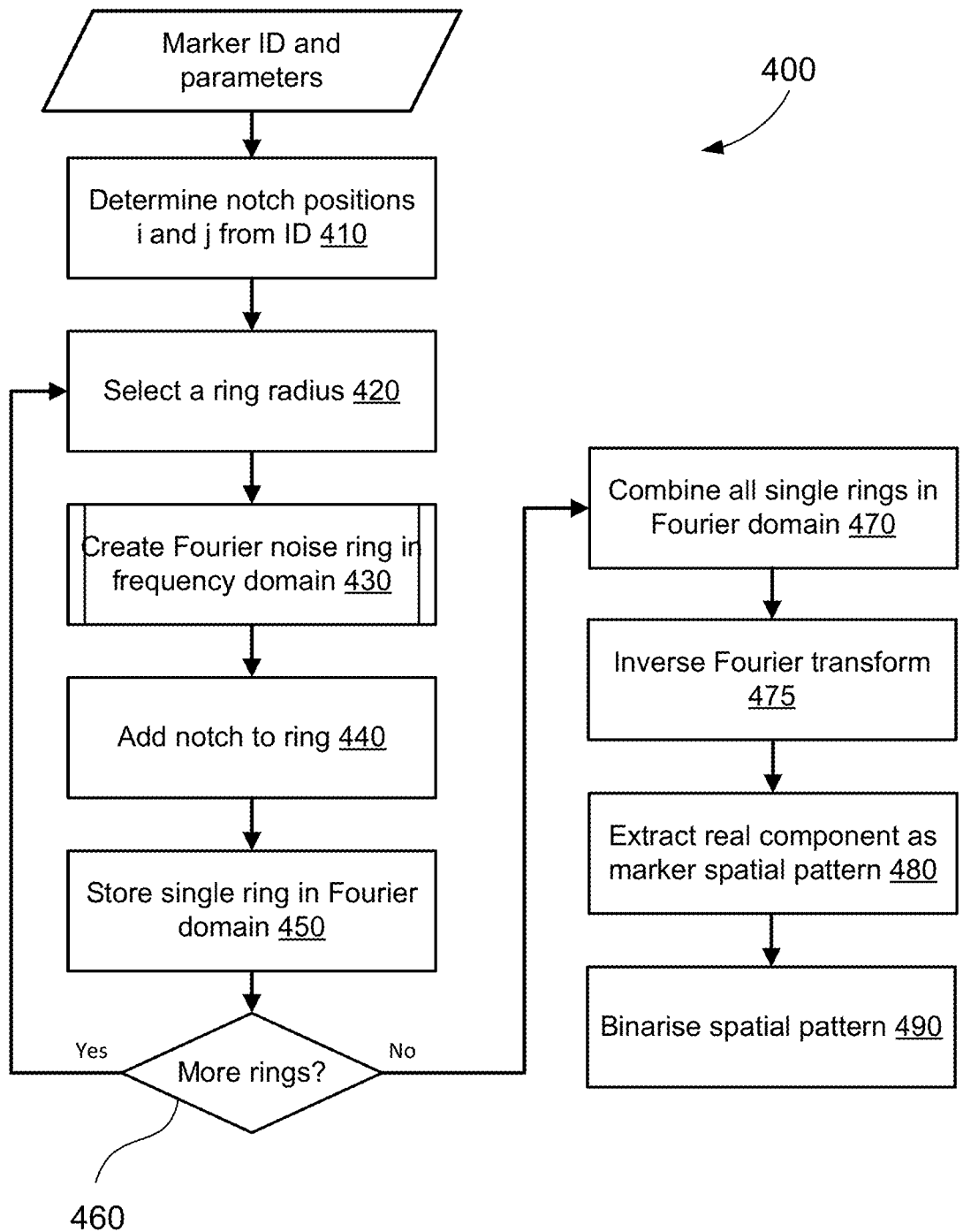
FIG. 4 is a schematic flow diagram illustrating a method of encoding an FNR marker pattern with an identifier according to one embodiment of the invention.

A method 400 of generating an FNR marker with an ID, as illustrated in FIG. 3, is now described with reference to FIG. 4. The method 400 can be implemented as one or more computer programs that are executable by the processor 1305.

The method 400 starts at a determining step 410 with the following input parameters: the ID to be encoded, the radius of each ring, the width of each ring, and the dimensions of the FNR marker pattern. In execution of the step 410, two notch positions i and j are determined using Equations (2) and (3). The method 400 then proceeds from the determining step 410 to a selecting step 420.

In the selecting step 420, a ring radius value is selected from the set of input radii for further processing. The method 400 proceeds from the selecting step 420 to a creating sub-process 430.

The method 400 continues at the creating sub-process 430, in which a single Fourier noise ring is created in the frequency domain according to the input parameters. The creating sub-process 430 is similar to the FNR pattern generation process described above with reference to steps 510 and 520 of FIG. 5.

At the conclusion of the creating sub-process 430, a single Fourier noise ring in the frequency domain is output. The method 400 proceeds from the creating sub-process 430 to an adding step 440.

In adding step 440, the single Fourier noise ring is received. In step 440, a pair of symmetric notches is added to one of the notch positions (there are two rings: the inner ring is associated with notch i and the outer is with j as shown in FIG. 3) determined in step 410.

As an example, a symmetric notch can be added to position i at the radius $r_i$ with width dr as follows:
1. Determine an arc segment spanned by the notch: $(\theta_{io}, \theta_{if})$ where $\theta_{io}$ is the initial angular position of the segment, and $\theta_{if}$ is the final angular position of the segment. The segment length is $\theta_{if} - \theta_{io} = 30°$.
2. Determine the minimum and maximum radii occupied by the ring:
   a. $r_{min} = r_i - dr/2$ and $r_{max} = r_i + dr/2$
3. Generate a grid of sampling points in polar coordinates: $(r_p, \theta_p)$ where $r_p = \{r_{min}, r_{min} + \Delta r, \ldots, r_{max}\}$ and $\theta_p = \{\theta_{io}, \theta_{io} + \Delta\theta \ldots, \theta_{if}\}$
4. Map the set of polar coordinates into Cartesian coordinates: $(x_p, y_p)$
5. Let $\mathcal{F}$ be a single Fourier noise ring in the Fourier domain. Set the magnitudes of $\mathcal{F}$ at the sampling points to zero: $|\mathcal{F}(x_p, y_p)| = 0$.
6. Repeat steps 3-5 for adding another notch at the symmetric arc segment: $(\theta_{io} + 180°, \theta_{if} + 180°)$ The method 400 continues from the adding step 440 to a storing step 450, where the ring with a symmetric pair of notches is stored in a memory location in the frequency domain for use in future steps. The method 400 proceeds from the storing step 450 to a decision step 460, where a check is performed to determine if there are more rings to be created. The method 400 returns to the selecting step 420 if there are more rings to be created (YES). Otherwise (NO), processing of the method 400 moves from the decision step 460 to a combining step 470.

In the combining step 470, all previously stored Fourier noise rings are combined in the frequency domain resulting in multiple notched concentric rings as illustrated in 930 of FIG. 9.

The method 400 continues from the combining step 470 to a transforming step 475, in which the FNR pattern in the frequency domain is inversely transformed to the spatial domain as a complex spatial pattern (i.e., each pixel of the complex pattern is represented by a complex number). In other words, the complex spatial pattern in the spatial domain is generated from the FNR pattern in the frequency domain.

The method 400 further progresses from the transforming step 475 to an extracting step 480. In the extracting step 480, the real component of the complex spatial pattern is extracted as the FNR marker. Finally, the method 400 continues from the extracting step 480 to a binarisation step 490, in which the greyscale FNR spatial pattern is converted to a black and white pattern as illustrated in the FNR pattern 220 of FIG. 2. The method 400 terminates after the binarisation step 490.

Figure 11:
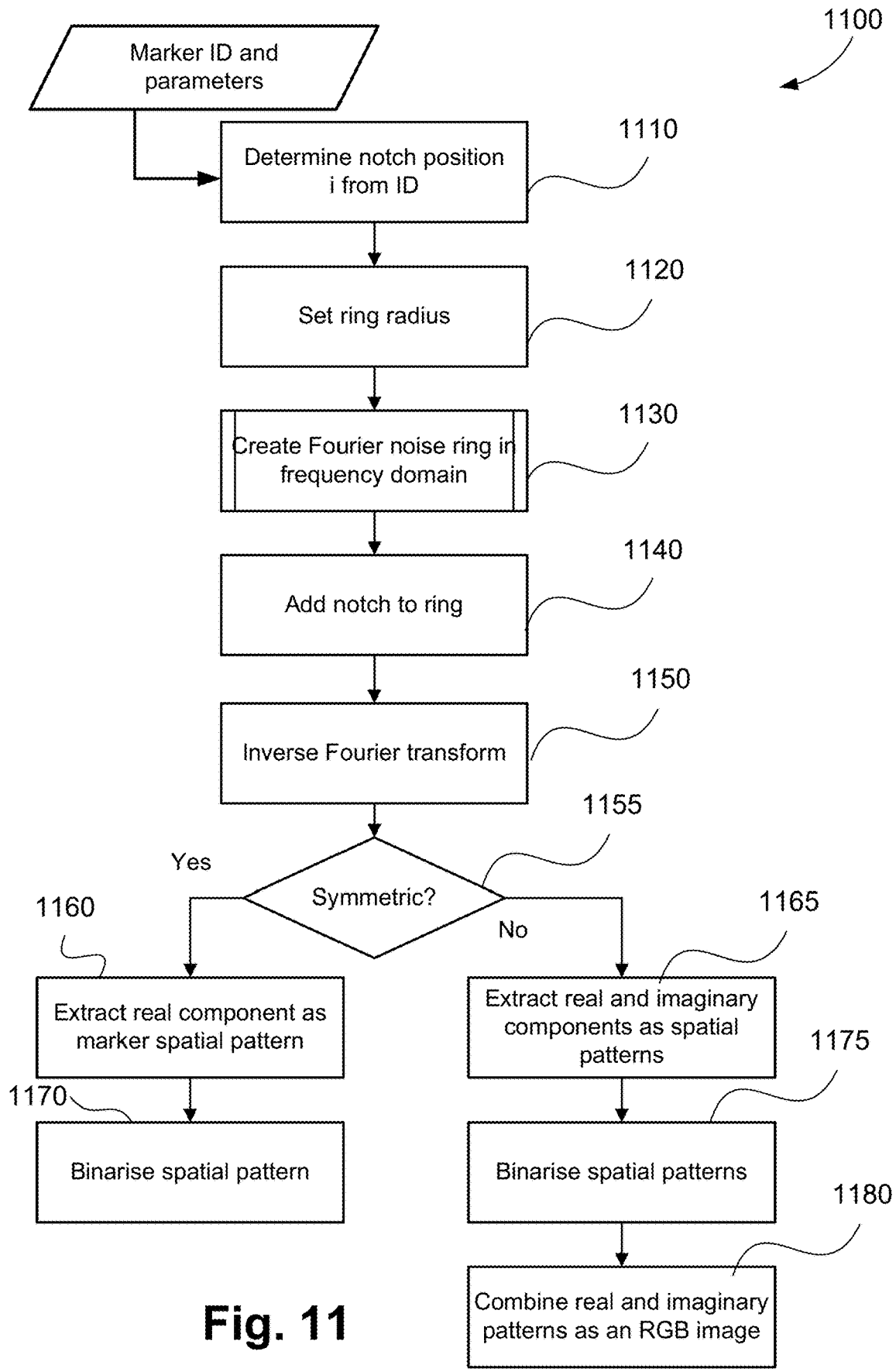
FIG. 11 is a schematic flow diagram illustrating a method of encoding an FNR marker pattern with an identifier having a single ring and a single notch arrangement according to one embodiment of the invention.

A method 1100 of generating an FNR marker for a single ring and a symmetric pair of notches (or a single notch), as illustrated in FIGS. 10A and 10B, is now described with reference to FIG. 11. The method 1100 can be implemented as one or more computer programs that are executable by the processor 1305.

The method 1100 starts at a determining step 1110 with the following input parameters: the ID to be encoded, the notch type (symmetric or non-symmetric), the notch arc angle, the radius of the ring, the width of the ring, and the dimensions of the FNR marker pattern. In execution of the step 1110, one notch position i is determined using Equation (11). The method 1100 then proceeds from the determining step 1110 to a setting step 1120.

In the setting step 1120, the input ring radius value is set for further processing. The method 1100 proceeds from the setting step 1120 to a creating sub-process 1130.

The method 1100 continues at the creating sub-process 1130, in which a single Fourier noise ring is created in the frequency domain according to the input parameters. The creating sub-process 1130 is similar to the FNR pattern generation process described above with reference to steps 510 and 520 of FIG. 5.

At the conclusion of the creating sub-process 1130, a single Fourier noise ring in the frequency domain is output. The method 1100 proceeds from the creating sub-process 1130 to an adding step 1140.

In adding step 1140, the single Fourier noise ring is received. In step 1140, a pair of symmetric notches or a single notch is added to the notch position determined in step 1110, and according to the input notch type, as shown in FIGS. 10A and 10B. As an example, a pair of symmetric notches (or a single notch) can be added to position i at the radius $r_i$ with width dr as follows:

1. Determine an arc segment spanned by the notch: ($\theta_{io}$, $\theta_{if}$) where $\theta_{io}$ is the initial angular position of the segment, and $\theta_{if}$ is the final angular position of the segment. The segment length is $\theta_{if} - \theta_{io} = 30°$.
2. Determine the minimum and maximum radii occupied by the ring:
   a. $r_{min} = r_i - dr/2$ and $r_{max} = r_i + dr/2$
3. Generate a grid of sampling points in polar coordinates: ($r_p$, $\theta_p$) where $r_p = \{r_{min}, r_{min}+\Delta r, \ldots, r_{max}\}$ and $\theta_p = \{\theta_{io}, \theta_{io}+\Delta\theta \ldots, \theta_{if}\}$
4. Map the set of polar coordinates into Cartesian coordinates: ($x_p$, $y_p$)
5. Let $\mathcal{F}$ be a single Fourier noise ring in the Fourier domain. Set the magnitudes of $\mathcal{F}$ at the sampling points to zero: $|\mathcal{F}(x_p, y_p)| = 0$.
6. Repeat steps 3-5 for adding another notch at the symmetric arc segment: ($\theta_{io}+180°$, $\theta_{if}+180°$). Step 6 is not performed for the non-symmetric notch arrangement shown in FIG. 10B.

The method 1100 continues from the adding step 1140 to a transforming step 1150, in which the FNR pattern in the frequency domain is inversely transformed to the spatial domain as a complex spatial pattern (i.e., each pixel of the complex pattern is represented by a complex number). The method 1100 further progresses from the transforming step 1150 to a decision step 1155, where the input notch type (symmetric or non-symmetric) is checked.

If the input notch type is determined to be symmetric (YES), the method 1100 proceeds from step 1155 to an extracting step 1160. Otherwise, if the input notch type is determined to be not symmetric (NO), the method 1100 proceeds from step 1155 to an extracting step 1165.

In the extracting step 1160, the real component of the complex spatial pattern is extracted as the FNR marker. Next, the method 1100 continues from the extracting step 1160 to a binarisation step 1170, in which the greyscale FNR spatial pattern is converted to a black and white pattern as illustrated in 220 of FIG. 2. The method 1100 terminates after the binarisation step 1170.

In the extracting step 1165, the real and imaginary components of the complex spatial pattern are extracted as two 2D spatial patterns as shown in 1410 and 1420 of FIG. 13A. Next, the method 1100 continues from the extracting step 1165 to a binarisation step 1175, in which the two spatial patterns 1410 and 1420 are converted to binary patterns (black=0 and white=255 for an 8-bit image) as illustrated in 1410 and 1420 of FIG. 13A. The method 1100 continues to a combining step 1180, in which the two spatial patterns 1410 and 1420 are stored in different colour channels, for example in red and blue channels, respectively, resulting in an RGB image as shown in 1440 of FIG. 13B. The method 1100 terminates after the combining step 1180.

Figure 6:
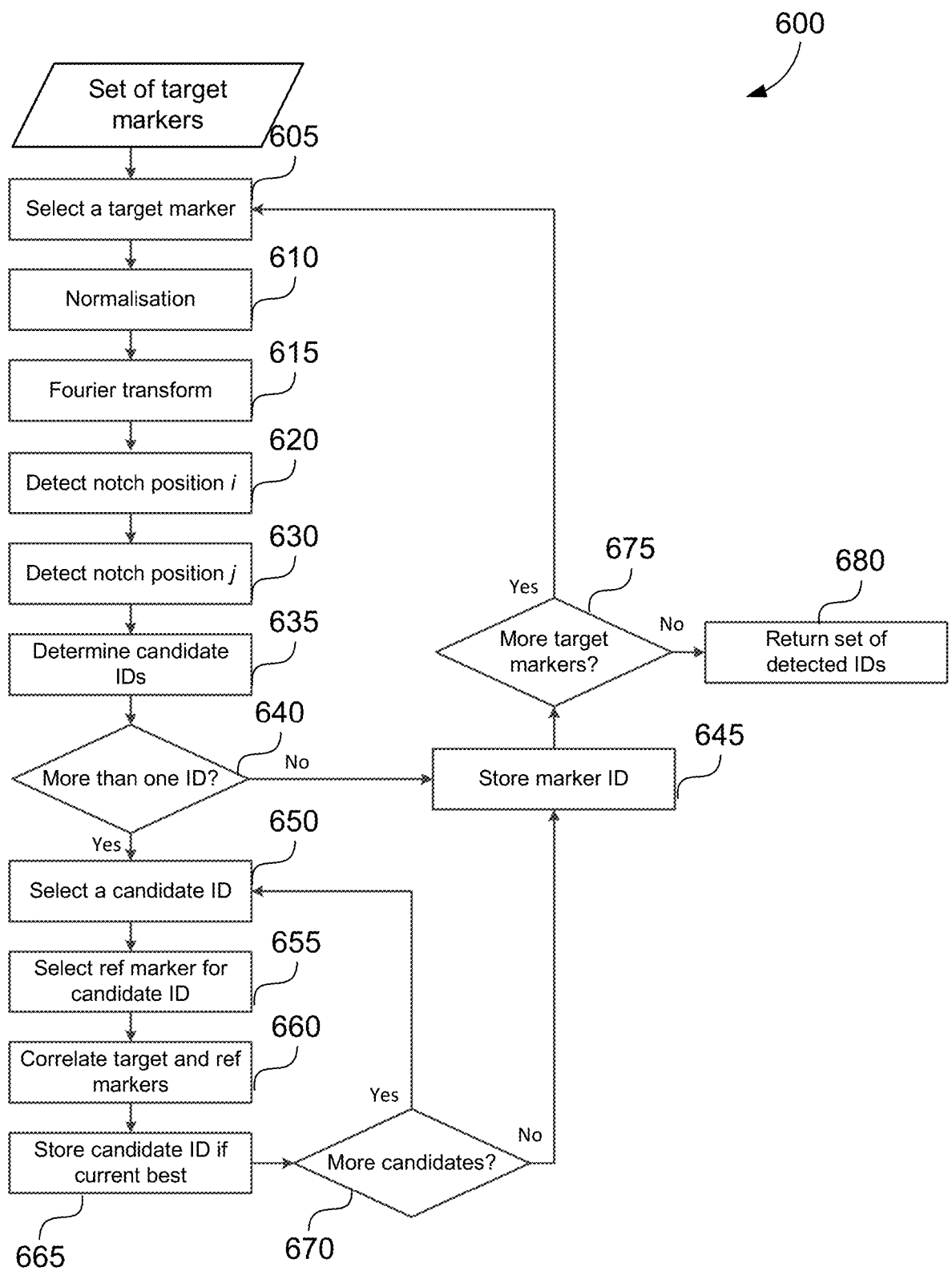
FIG. 6 is a schematic flow diagram illustrating a method of decoding an identifier of an FNR marker pattern according to one embodiment of the invention.

A method 600 of decoding the identifiers of a set of target FNR markers is now described with reference to FIG. 6. The method 600 can be implemented as one or more computer programs that are executable by the processor 1305.

The method 600 starts at a selecting step 605 with a set of target FNR markers as input. The set of target FNR markers are as shown in FIGS. 2B and 9. Each of the target FNR markers is assumed to have been detected and localised from an input scene. For example, physical FNR markers are scattered throughout an arena and a camera captures images of the FNR markers. It is further assumed that the target FNR markers are rectified with minimal perspective distortion. Rectification means to make the target marker orthogonal to the view direction with the correct aspect ratio and rotated upright. The target FNR markers have also been generated using the method 400.

In step 605, a target FNR marker is selected from the set of detected target FNR markers in the input scene. The method 600 continues from the selecting step 605 to a normalisation step 610, in which a zero-mean normalisation is performed on the selected FNR target marker such that the mean intensity of the selected FNR target marker is zero after normalisation. The method 600 moves from the normalisation step 610 to a transform step 615, in which the selected target FNR marker is transformed to the frequency domain. The method 600 progresses from the transform step 615 to a detection step 620.

In the detection step 620, one or more possible notch positions in the inner Fourier noise ring is detected as notch position i.

As an example, a symmetric notch can be detected along the circular path of the Fourier noise ring in the magnitude spectrum of the target FNR marker's Fourier representation $\mathcal{F}_t$ at a radius of $r_i$ with width dr as follows:

1. For each of the six possible notch positions: i = $\{1, \ldots, 6\}$ shown in FIG. 3:
   a. Generate a grid of sampling points in polar coordinates: ($r_p$, $\theta_p$) where $r_p = \{r_{min}, r_{min}+\Delta r, \ldots, r_{max}\}$ and $\theta_p = \{\theta_{io}, \theta_{io}+\Delta\theta \ldots, \theta_{if}, \theta_{io}+180, \theta_{io}+180+\Delta\theta \ldots, \theta_{if}+180\}$
   b. Map the set of polar coordinates ($r_p$, $\theta_p$) into Cartesian coordinates: ($x_p$, $y_p$)
   c. Interpolate the magnitudes of the target Fourier transform $\mathcal{F}_t$ at the sampling points ($x_p$, $y_p$): $|\mathcal{F}_t(x_p, y_p)|$
   d. Calculate an arc segment strength value: $s_i = \Sigma |\mathcal{F}_t(x_p, y_p)|$. This value represents the strength of the given arc segment in the magnitude spectrum. It is assumed that the arc segment with the weakest strength value is the notch position. In practice, however, there might not be one clear stand out notch position (i.e., the weakest arc segment strength might only be slightly lower than the second weakest one) due to distortion of the target marker, e.g., rotation.
2. Sort the six arc segment strength values in ascending order: $\mathcal{S} = \{s_j, s_k, \ldots, s_o\}$, where $s_j < s_k < \ldots < s_o$ and j, k, o $\in$ i = $\{1, \ldots, 6\}$
3. If the arc segment j with the weakest strength value $s_j$ is significantly weaker (e.g., $s_j < 0.5 s_k$) than the second weakest strength $s_k$, then the detected notch position i=j. Otherwise, notch position i=$\{j,k\}$. i.e., there is more than one possible candidate notch position.

The method 600 continues from the detection step 620 to another detection step 630. In step 630, one or more possible notch positions in the outer Fourier noise ring is detected as notch position j using a method as described above for detecting the notch position i.

After detecting the notch positions i and j, the method 600 continues from the detection step 630 to a determining step 635. In determining step 635, a set of candidate marker IDs are determined by Equation (1) using the notch positions i and j, which are detected at steps 620 and 630 respectively. Therefore, if each of the notch positions i and j has only one possible candidate notch position, then one candidate ID is determined. However, if each of the notch positions i and j has more than one possible candidate notch position (see item 3 in the detection step 620), then there are more than one candidate IDs determined in step 635.

The method 600 proceeds from the determining step 635 to a decision step 640, where a check is performed to determine if there is more than one candidate ID. The method 600 proceeds from the decision step 640 to a storing step 645 if there is no more than one candidate ID (NO). Otherwise (YES), processing of the method 600 moves from the decision step 640 to a selecting step 650.

In the storing step 645, the only candidate ID is stored in the memory as the decoded ID of the currently selected target FNR marker.

In the selecting step 650, a candidate ID is selected from the set of candidate IDs determined at step 635. The method 600 continues from the selecting step 650 to another selecting step 655, where a reference FNR marker corresponding to the selected candidate ID is selected.

The method 600 proceeds from the selecting step 655 to a correlating step 660. The selected target and reference FNR markers are correlated at the correlating step 660 to produce a cross-correlation score. The method 600 continues from the correlating step 660 to a storing step 665. In the storing step 665, the current candidate ID is stored in the memory if the current candidate ID has a higher cross-correlation score in comparison with the cross-correlation score of a candidate ID currently stored in the memory. The method 600 proceeds from the storing step 665 to a decision step 670.

In step 670, a check is performed to determine whether there are more candidate IDs to be processed. The method 600 returns from the decision step 670 to the selecting step 650 to select a next candidate ID if there are more candidate IDs (YES). Otherwise (NO), processing of the method 600 moves from the decision step 670 to the storing step 645, where the candidate ID with the highest cross-correlation score is stored as the ID of the target FNR marker.

The method 600 proceeds from the storing step 645 to a decision step 675.

In step 675, a check is performed to determine whether there are more target markers to be processed. The method 600 returns from the decision step 675 to the selecting step 605 to select a next target FNR marker if there are more target markers (YES). Otherwise (NO), processing of the method 600 moves from the decision step 675 to a returning step 680, where a set of decoded marker IDs is returned. The method 600 terminates after the returning step 680.

Figure 12:
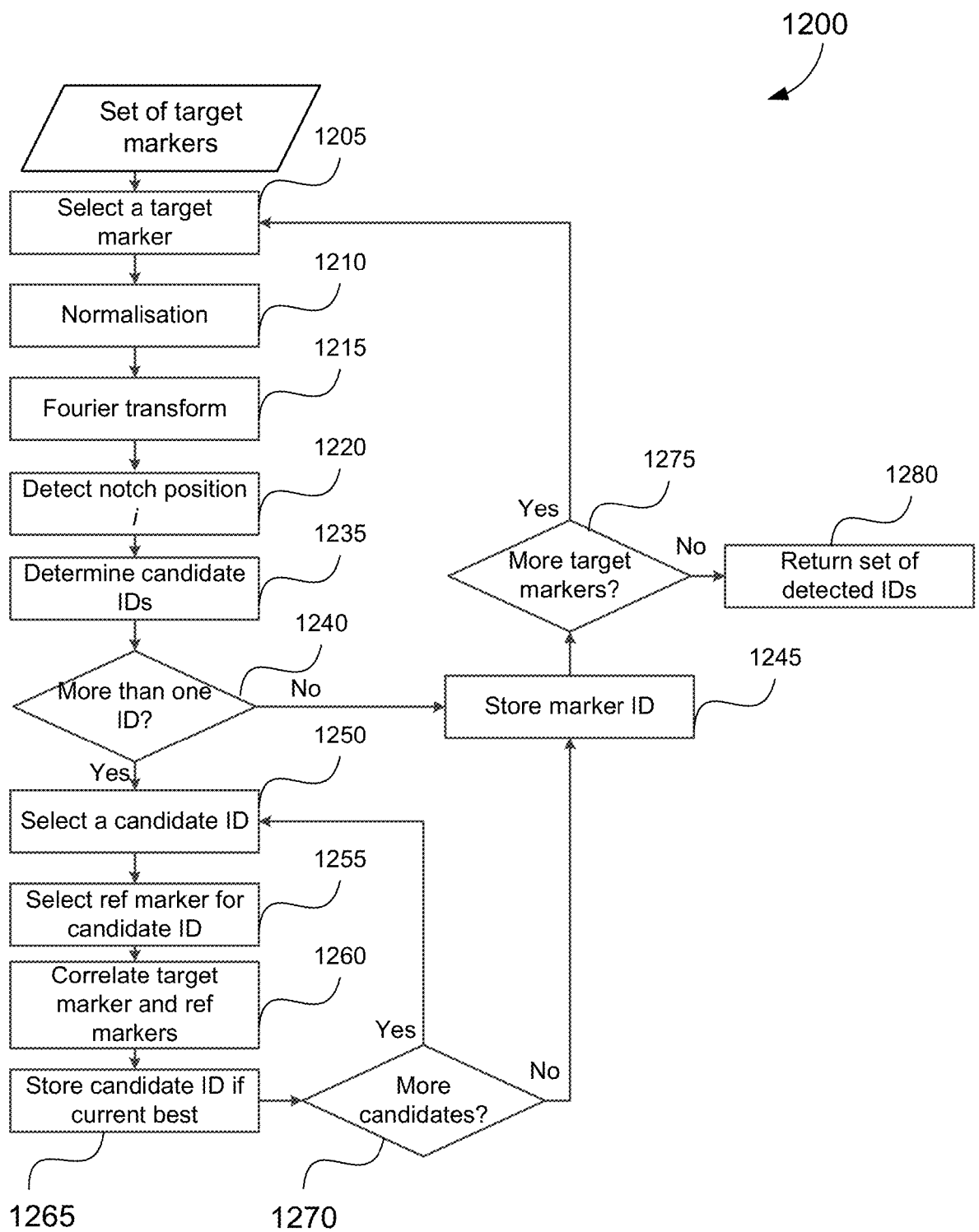
FIG. 12 is a schematic flow diagram illustrating a method of decoding an identifier of an FNR marker pattern with an identifier having a single ring and a single notch arrangement according to one embodiment of the invention.

A method 1200 of decoding the identifiers of a set of single ring and single notched target FNR markers is now described with reference to FIG. 12. The method 1200 can be implemented as one or more computer programs that are executable by the processor 1305.

The method 1200 starts at a selecting step 1205 with a set of target FNR markers as input. The set of target FNR markers is assumed to have been detected and localised from an input scene, for example, a camera image of a large sports arena with physical FNR markers scattered throughout the arena. It is further assumed that the target FNR markers are rectified with minimal perspective distortion.

In step 1205, a target FNR marker is selected from the set of detected target FNR markers in the input scene. The method 1200 continues to a normalisation step 1210, in which a zero-mean normalisation is performed on the selected FNR marker such that the mean intensity of the marker is zero after normalisation. The method 1200 moves from the normalisation step 1210 to a transform step 1215, in which the target FNR marker is transformed to the frequency domain. The method 1200 progresses from the transform step 1215 to a detection step 1220.

In the detection step 1220, one or more possible notch positions in the Fourier noise ring is detected as notch position i.

As an example, a symmetric pair of notches (or a single notch) as shown in either FIG. 10A or 10B can be detected along the circular path of the Fourier noise ring in the magnitude spectrum of the target FNR marker's Fourier representation $\mathcal{F}_t$ at a radius of $r_i$ with width dr as follows:

1. For each of the six and twelve possible notch positions: i={1, . . . , 6} and i={1, . . . , 12} shown in FIGS. 10A and 10B, respectively:
   a. Generate a grid of sampling points in polar coordinates: $(r_p, \theta_p)$ where $r_p=\{r_{min}, r_{min}+\Delta r, \ldots, r_{max}\}$ and $\theta_p=\{\theta_{io}, \theta_{io}+\Delta\theta \ldots, \theta_{if}, \theta_{io}+180, \theta_{io}+180+\Delta\theta \ldots, \theta_{if}+180\}$ for symmetric notch type, and $\theta_p=\{\theta_{io}, \theta_{io}+\Delta\theta \ldots, \theta_{if}\}$ for non-symmetric notch type.
   b. Map the set of polar coordinates $(r_p, \theta_p)$ into Cartesian coordinates: $(x_p, y_p)$
   c. Interpolate the magnitudes of the target Fourier transform $\mathcal{F}_t$ at the sampling points $(x_p, y_p)$: $|\mathcal{F}_t(x_p, y_p)|$
   d. Calculate an arc segment strength value: $s_i = \Sigma_p |\mathcal{F}_t(x_p, y_p)|$. This value represents the strength of the given arc segment in the magnitude spectrum. It is assumed that the arc segment with the weakest strength value is the notch position. In practice, however, there might not be one clear stand out notch position (i.e., the weakest arc segment strength might only be slightly lower than the second weakest one) due to distortion of the target marker, e.g., rotation.
2. Sort the six or twelve arc segment strength values in ascending order: $\mathcal{S}=\{s_j, s_k, \ldots, s_o\}$, where $s_j < s_k < \ldots < s_o$ and j, k, o∈i={1, . . . , 6} for symmetric notch type or j, k, o∈i={1, . . . , 12} for non-symmetric notch type.
3. If the arc segment j with the weakest strength value $s_j$ is significantly weaker (e.g., $s_j < 0.5 s_k$) than the second weakest strength $s_k$, then the detected notch position i=j. Otherwise, notch position i={j, k}. i.e., there is more than one possible candidate notch position.

After detecting the notch position i, the method 1200 continues from the detection step 1220 to a determining step 1235. In step 1235, a set of candidate marker IDs are determined by Equation (10) using the notch position i. The method 1200 proceeds from the determining step 1235 to a decision step 1240, where a check is performed to determine if there is more than one candidate ID. The method 1200 proceeds from the decision step 1240 to a storing step 1245 if there is no more than one candidate ID (NO). Otherwise (YES), processing of the method 1200 moves to a selecting step 1250.

In step 1245, the only candidate ID is stored in the memory as the decoded ID of the currently selected target FNR marker.

In step 1250, a candidate ID is selected from the set of candidate IDs determined at step 1235. The method 1200 continues from step 1250 to another selecting step 1255, where a reference FNR marker corresponding to the selected candidate ID is selected.

The method 1500 proceeds from the selecting step 1555 to a correlating step 1560. The target and reference FNR markers are correlated at the correlating step 1260 to produce a cross-correlation score. The method 1200 continues from the correlating step 1260 to a storing step 1265. In step 1265, the current candidate ID is stored in the memory if the current candidate ID has a higher cross-correlation score in comparison with the cross-correlation score of a candidate ID currently stored in the memory. The method 1200 proceeds from the storing step 1265 to a decision step 1270.

In step 1270, a check is performed to determine whether there are more candidate IDs to be processed. The method 1200 returns to the selecting step 1250 to select a next candidate ID if there are remaining candidate IDs (YES). Otherwise (NO), processing of the method 1200 moves from the decision step 1270 to the storing step 1245, where the candidate ID with the highest cross-correlation score is stored as the ID of the target FNR marker.

The method 1200 proceeds from the storing step 1245 to a decision step 1275.

After processing one target FNR marker, a check is performed at a decision step 1275 to determine whether there are more target markers to be processed. The method 1200 returns to the selecting step 1205 to select a next target FNR marker if there are remaining target markers (YES). Otherwise (NO), processing of the method 1200 moves from the decision step 1275 to a returning step 1280, where a set of decoded marker IDs is returned. The method 1200 terminates after the returning step 1280.

Figure 7:
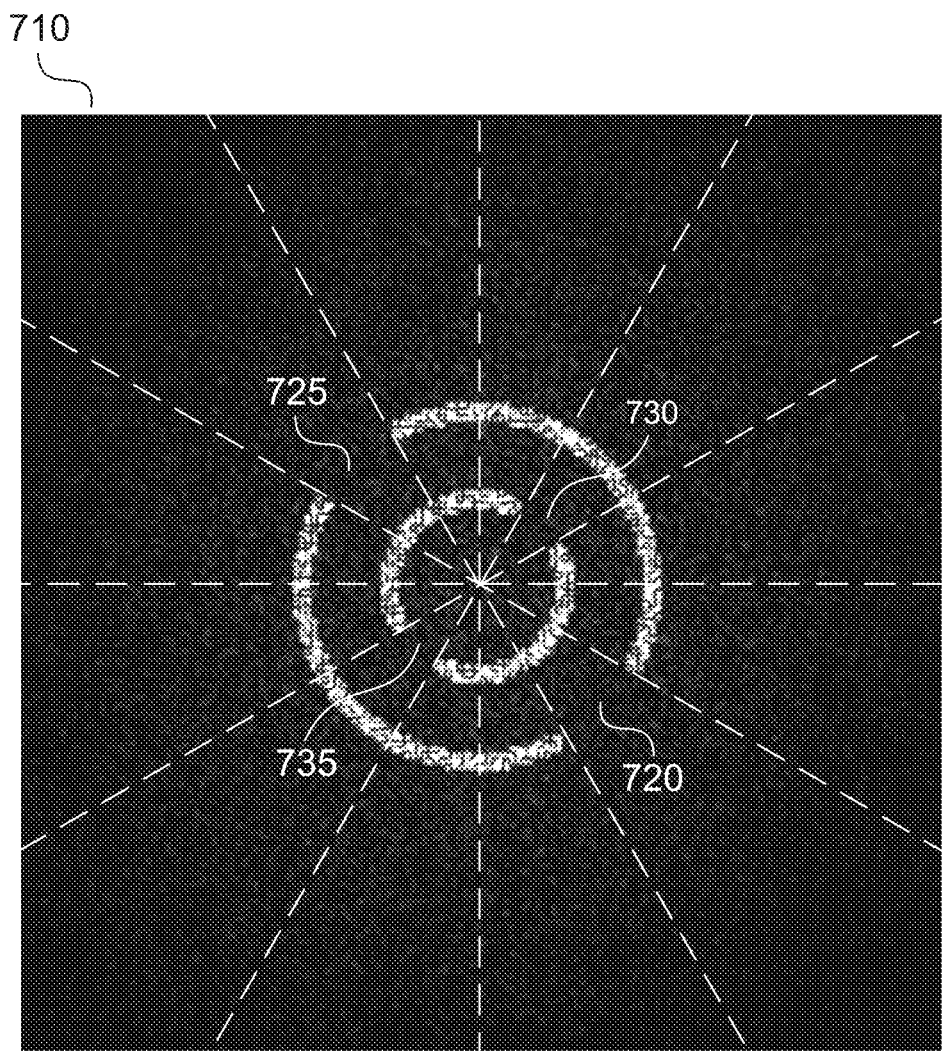
FIG. 7 is an illustration of an FNR marker pattern with an identifier in the frequency domain.

FIG. 7 shows a magnitude spectrum 710 of an example target FNR marker in the frequency domain. The ID of the FNR marker in FIG. 7 is encoded using the encoding method described above with reference to FIGS. 3 and 4. Therefore, the ID can be determined by using Equation (1) with notch positions i and j. The target FNR marker has two rings with a pair of symmetric notches at 730 and 735 in the inner ring, and a pair of symmetric notches at 720 and 725 in the outer ring.

As described above with reference to FIG. 6, notch position i is determined by partitioning each ring into six arc segments as indicated by the dash lines in FIG. 7, and calculating an arc segment strength for each segment. In the example shown in FIG. 7, notch position 2 (see FIG. 3 for notch position labels) in the inner ring is the arc segment with the weakest strength. Thus, notch position i is 2. Similarly, notch position 5 in the outer ring is the arc segment with the weakest strength and, thus, notch position j in the outer ring is 5. Therefore, the ID of the target FNR marker in FIG. 7 is 11 according to Equation (1).

Example(s)/Use Case(s)

Figure 8:
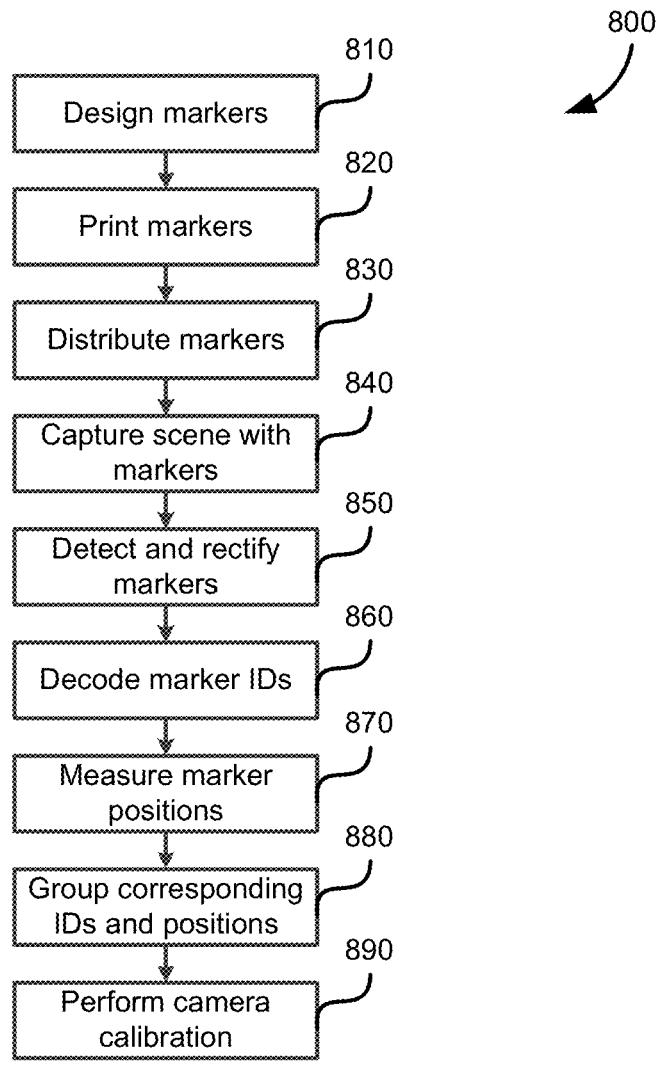
FIG. 8 is a schematic flow diagram illustrating an application of the FNR marker patterns for camera calibration.

FIG. 8 shows a flowchart of a method 800 of using the FNR markers for multi-camera calibration in a large sports arena such as a sports stadium. The method 800 can be implemented as one or more computer programs that are executable by the processor 1305.

The method 800 begins at a designing step 810, where the user chooses a set of appropriate FNR parameters (e.g., number of markers, ring radii, ring width, pattern dimensions, etc) to design a set of digital reference FNR markers. The design of an FNR marker is in accordance with the methods 400 and 1100 (which is shown in FIGS. 4 and 11).

The method 800 continues from the designing step 810 to a printing step 820, where the user prints the set of digital reference FNR markers into physical markers and mounts the physical FNR markers on portable flat substrates (e.g., foam core). The method 800 then proceeds from the printing step 820 to a distributing step 830. The physical markers are then distributed throughout the arena at a distributing step 830. The method 800 continues from the distributing step 830 to a capturing step 840, where the user controls a network of cameras to capture overlapping views of the arena containing one or more FNR markers within each view.

After capturing multiple views of the arena, the method 800 continues from the capturing step 840 to a detecting step 850. In the detecting step 850, a set of target FNR markers are detected, localised and rectified. The method 800 proceeds from the detecting step 850 to a decoding step 860. The set of target FNR markers are then processed at the decoding step 860 in accordance with the methods 600 and 1200, as described above with reference to FIGS. 6 and 12.

After decoding the IDs of the target markers, the method 800 proceeds from the decoding step 860 to a measuring step 870. In step 870, the corresponding set of reference FNR markers is used to measure sub-pixel positions (e.g., the coordinate of the centre of the FNR markers) of those target markers within the captured camera images.

The method 800 continues from the measuring step 870 to a grouping step 880, in which corresponding decoded IDs and measured marker positions are grouped together to form a set of image correspondences across all camera views. The method 800 proceeds from the grouping step 880 to a calibration step 890.

The set of image correspondences is used in the calibration step 890, in which a large scale bundle adjustment is performed to estimate intrinsic and extrinsic camera parameters for each camera. The method 800 concludes at the conclusion of step 890.

The arrangements described are applicable to the computer and data processing industries and particularly for the generation of calibration marker patterns.

The foregoing describes only some embodiments of the present invention, and modifications and/or changes can be made thereto without departing from the scope and spirit of the invention, the embodiments being illustrative and not restrictive.

The invention claimed is:

1. A method of calibrating imaging apparatuses using an image, the method comprising:
   receiving an image comprising a spatial pattern, wherein the image is generated based on a two-dimensional pattern in a frequency domain where one or more peripheral properties of the two-dimensional pattern are modified;
   normalising the spatial pattern of the received image;
   transforming the normalised spatial pattern to the frequency domain, wherein the transformed spatial pattern comprises the two-dimensional pattern with modified one or more peripheral properties;
   detecting the modified one or more peripheral properties of the two-dimensional pattern;
   determining identification information based on the detected modified one or more peripheral properties;
   specifying a position of the received image; and
   calibrating the imaging apparatuses based on the determined identification information and the specified position of the received image.

2. The method according to claim 1, further comprising:
forming a set of image correspondences across all views of the imaging apparatuses by grouping the identification information and the specified position of the image.

3. The method according to claim 2, wherein the modified one or more peripheral properties comprises one or more discontinuities in the two-dimensional pattern.

4. The method according to claim 3, wherein a phase of the two-dimensional pattern is modified to encode the identification information.

5. The method according to claim 3, wherein the two-dimensional pattern comprises a ring.

6. The method according to claim 1, wherein the two-dimensional pattern is a Fourier noise ring.

7. The method according to claim 1, wherein the spatial pattern comprises a two colour combination representing the two-dimensional pattern.

8. A non-transitory computer readable medium comprising a computer program, the computer program being executable by a processor, the computer program comprises a method of calibrating imaging apparatuses using an image, the method comprising:
receiving an image comprising a spatial pattern, wherein the image is generated based on a two-dimensional pattern in a frequency domain where one or more peripheral properties of the two-dimensional pattern are modified;
normalising the spatial pattern of the received image;
transforming the normalised spatial pattern to the frequency domain, wherein the transformed spatial pattern comprises a two-dimensional pattern with modified one or more peripheral properties;
detecting the modified one or more peripheral properties of the two-dimensional pattern;
determining identification information based on the detected modified one or more peripheral properties;
specifying a position of the received image; and
calibrating the imaging apparatuses based on the determined identification information and the specified position of the received image.

9. A method of generating an image, comprising:
obtaining identification information;
generating an image having a circular pattern in a frequency domain based on the obtained identification information, the circular pattern having a discrete portion which is on a circumference of the circular pattern and corresponds to the obtained identification information; and
generating an image in a spatial domain based on the generated image.

10. The method according to claim 9, wherein the image having the circular pattern in the frequency domain has one or more circular patterns.

11. The method according to claim 9, wherein the circular pattern has a radius corresponding to the obtained identification information.

12. The method according to claim 9, wherein a position of the discrete portion on a circumference of the circular pattern is determined based on the obtained identification information.

13. The method according to claim 9, wherein the circular pattern has discrete portions which are positioned in point symmetrical positions.

14. The method according to claim 9, wherein the circular pattern has at least two discrete portions, and one discrete portion of the at least two discrete portions is not positioned in point symmetrical position of the other discrete portion of the at least two discrete portions.

15. The method according to claim 9, wherein the image in the spatial domain is generated by transforming the generated image having the circular pattern in the frequency domain to the spatial domain.

16. The method according to claim 9, wherein the generated image in the spatial domain is a binary image.

17. A non-transitory computer readable medium comprising a computer program, the computer program being executable by a processor, the computer program comprises a method of generating an image, comprising:
obtaining identification information;
generating an image having a circular pattern in a frequency domain based on the obtained identification information, the circular pattern having a discrete portion which is on a circumference of the circular pattern and corresponds to the obtained identification information; and
generating an image in a spatial domain based on the generated image.

* * * * *